United States Patent
Tani et al.

(10) Patent No.: US 12,436,442 B2
(45) Date of Patent: Oct. 7, 2025

(54) WAVEGUIDE DEVICE, OPTICAL SCANNING DEVICE AND OPTICAL MODULATION DEVICE

(71) Applicant: NGK INSULATORS, LTD., Nagoya (JP)

(72) Inventors: Kentaro Tani, Miyoshi (JP); Jungo Kondo, Nagoya (JP); Keiichiro Asai, Nagoya (JP); Shuhei Higashihara, Nagoya (JP); Naoki Fujita, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 69 days.

(21) Appl. No.: 18/411,196

(22) Filed: Jan. 12, 2024

(65) Prior Publication Data
US 2024/0142852 A1 May 2, 2024

Related U.S. Application Data

(63) Continuation of application No. PCT/JP2022/018041, filed on Apr. 18, 2022.

(30) Foreign Application Priority Data
Jul. 14, 2021 (JP) .................. 2021-116666

(51) Int. Cl.
*G02F 1/313* (2006.01)

(52) U.S. Cl.
CPC .................. *G02F 1/313* (2013.01)

(58) Field of Classification Search
CPC ..... G02F 1/295; G02F 1/2955; G02F 2202/32
USPC ................................... 385/4, 8, 10
See application file for complete search history.

(56) References Cited

U.S. PATENT DOCUMENTS

| | | |
|---|---|---|
| 6,754,408 B2 | 6/2004 | Toda et al. |
| 6,895,138 B2 | 5/2005 | Toda et al. |
| 6,931,191 B2 | 8/2005 | Kitagawa et al. |
| 7,068,875 B2 | 6/2006 | Toda et al. |
| 7,242,839 B2 | 7/2007 | Sakai et al. |

(Continued)

FOREIGN PATENT DOCUMENTS

| | | |
|---|---|---|
| JP | 59-068722 A | 4/1984 |
| JP | 2002-296626 A | 10/2002 |

(Continued)

OTHER PUBLICATIONS

International Preliminary Report on Patentability received in corresponding International Application No. PCT/JP2022/018041 dated Jan. 25, 2024.

(Continued)

*Primary Examiner* — Robert Tavlykaev
(74) *Attorney, Agent, or Firm* — MATTINGLY & MALUR, PC

(57) ABSTRACT

A waveguide device includes: a photonic crystal layer having holes periodically formed in an electro-optical crystal substrate; a line-defect optical waveguide formed in the photonic crystal layer; a first electrode arranged above the electro-optical crystal substrate, the first electrode being transparent to light; and a second electrode arranged below the electro-optical crystal substrate. Each of an optical scanning device and an optical modulation device includes the above-mentioned waveguide device.

8 Claims, 17 Drawing Sheets

(56) References Cited

U.S. PATENT DOCUMENTS

| | | | |
|---|---|---|---|
| 7,532,777 B2 | 5/2009 | Mitomi et al. | |
| 7,660,506 B2 | 2/2010 | Mitomi et al. | |
| 11,079,541 B2 | 8/2021 | Baba et al. | |
| 11,448,729 B2 | 9/2022 | Baba et al. | |
| 11,906,825 B2 * | 2/2024 | Daryoush | G02F 1/065 |
| 2002/0159021 A1 | 10/2002 | Toda et al. | |
| 2003/0128949 A1 | 7/2003 | Kitagawa et al. | |
| 2004/0202406 A1 | 10/2004 | Toda et al. | |
| 2005/0232535 A1 | 10/2005 | Toda et al. | |
| 2006/0083472 A1 | 4/2006 | Sakai et al. | |
| 2007/0269176 A1 | 11/2007 | Mitomi et al. | |
| 2008/0050082 A1 | 2/2008 | Mitomi et al. | |
| 2019/0033522 A1 | 1/2019 | Baba et al. | |
| 2019/0204419 A1 | 7/2019 | Baba et al. | |
| 2020/0225411 A1 * | 7/2020 | Baba | G02F 1/29 |

FOREIGN PATENT DOCUMENTS

| JP | 2003-202439 A | 7/2003 |
|---|---|---|
| JP | 2006-301104 A | 11/2006 |
| JP | 2007-310205 A | 11/2007 |
| JP | 2008-052109 A | 3/2008 |
| JP | 2008-310065 A | 12/2008 |
| JP | 4208754 B2 | 1/2009 |
| WO | 2008/098404 A2 | 8/2008 |
| WO | 2017/126386 A1 | 7/2017 |
| WO | 2018/003852 A1 | 1/2018 |
| WO | 2018/186471 A1 | 10/2018 |

OTHER PUBLICATIONS

International Search Report of PCT/JP2022/018041 dated Jun. 7, 2022.

Written Opinion of the International Searching Authority dated Jun. 7, 2022.

Japanese Office Action issued Sep. 5, 2023 in corresponding to Japanese Application JP2022-541936.

* cited by examiner

WAVEGUIDE DEVICE, OPTICAL SCANNING DEVICE AND OPTICAL MODULATION DEVICE

CROSS-REFERENCE TO RELATED APPLICATIONS

This application is a continuation under 35 U.S.C. 120 of International Application PCT/JP2022/018041 having the International Filing Date of 18 Apr. 2022 and having the benefit of the earlier filing dates of Japanese Application No. 2021-116666, filed on 14 Jul. 2021. Each of the identified applications is fully incorporated herein by reference.

BACKGROUND OF THE INVENTION

1. Field of the Invention

The present invention relates to a waveguide device, an optical scanning device, and an optical modulation device.

2. Description of the Related Art

A waveguide device including an optical waveguide is being developed as an electro-optical device. As such waveguide device, there are known, for example, an optical scanning device for scanning an object with laser light at a wide angle, and an optical modulation device for changing the phase or the like of light.

In particular, an investigation has been made on the application of the optical scanning device to an obstacle-detecting system or a ranging system for the automatic operation control of an automobile or for the position control of a mobile terminal or a robot or a drone because the device can be used as a laser radar, a laser scanner, or light detection and ranging (LIDAR), and development thereof has become active.

A light deflector obtained by arranging a radiation mechanism on a silicon photonic crystal waveguide has been proposed as an example of the optical scanning device (Patent Literatures 1 to 4). However, such light deflector has such a configuration that its deflection angle is changed for each wavelength or the deflection angle is changed by heating the device. Accordingly, when the light deflector is used in such applications as described above, its scan angle is not sufficient. In addition, the light deflector of such a type that its deflection angle is changed for each wavelength involves a problem in that a plurality of light sources having different wavelengths are required, and the light deflector of such a type as to be heated involves a problem in that its response is slow.

CITATION LIST

Patent Literature

[PTL 1] WO 2017/126386 A1
[PTL 2] WO 2018/003852 A1
[PTL 3] WO 2018/186471 A1
[PTL 4] JP 4208754 B2

SUMMARY OF THE INVENTION

A primary object of the present invention is to provide a waveguide device, an optical scanning device, and an optical modulation device, each of which has a large scan angle, is quickly responsive, can be downsized, and can be reduced in driving voltage.

According to one embodiment of the present invention, there is provided a waveguide device, including: a photonic crystal layer having holes periodically formed in an electro-optical crystal substrate; a line-defect optical waveguide formed in the photonic crystal layer; a first electrode arranged above the electro-optical crystal substrate, the first electrode being transparent to light; and a second electrode arranged below the electro-optical crystal substrate, wherein each of the first electrode and the second electrode overlaps the optical waveguide in a thickness direction of the photonic crystal layer.

In one embodiment, the second electrode is transparent to light, and is brought into contact with the electro-optical crystal substrate, and each of the first electrode and the second electrode has a refractive index lower than a refractive index of the electro-optical crystal substrate.

In one embodiment, the waveguide device further includes: a substrate arranged below the second electrode; and a low-refractive index portion positioned between the second electrode and the substrate, the low-refractive index portion having a refractive index lower than the refractive index of the electro-optical crystal substrate (low-dielectric constant portion having a dielectric constant lower than a dielectric constant of the electro-optical crystal substrate). The low-refractive index portion overlaps the optical waveguide in the thickness direction of the photonic crystal layer.

In one embodiment, the waveguide device further includes a joining portion arranged between the second electrode and the substrate to join the second electrode and the substrate to each other. The joining portion has a cavity configured to function as the low-refractive index portion.

In one embodiment, the waveguide device further includes a low-refractive index portion positioned between the electro-optical crystal substrate and the second electrode, the low-refractive index portion having a refractive index lower than a refractive index of the electro-optical crystal substrate (low-dielectric constant portion having a dielectric constant lower than a dielectric constant of the electro-optical crystal substrate). The low-refractive index portion overlaps the optical waveguide in the thickness direction of the photonic crystal layer.

In one embodiment, the waveguide device further includes a joining portion arranged between the electro-optical crystal substrate and the second electrode to join the electro-optical crystal substrate and the second electrode to each other. A lower surface of the electro-optical crystal substrate, an upper surface of the second electrode, and the joining portion define a cavity configured to function as the low-refractive index portion.

In one embodiment, the electro-optical crystal substrate includes one selected from the group consisting of: lithium niobate; lithium tantalate; potassium titanate phosphate; potassium lithium niobate; potassium niobate; potassium tantalate niobate; and a solid solution of lithium niobate and lithium tantalate.

According to another aspect of the present invention, there is provided an optical scanning device, including the above-mentioned waveguide device, wherein the waveguide device further includes a diffraction grating arranged in at least one portion selected from an upper portion, a left side surface portion, and a right side surface portion of the optical waveguide, the optical scanning device being configured so that an emission angle of light emitted from an upper surface of the optical waveguide is changed.

According to still another aspect of the present invention, there is provided an optical modulation device, including the above-mentioned waveguide device, wherein the optical waveguide is a Mach-Zehnder optical waveguide including a first waveguide and a second waveguide, and wherein the first electrode is arranged so as to overlap the first waveguide in the thickness direction of the photonic crystal layer.

In one embodiment, the optical modulation device further includes a third electrode arranged above the electro-optical crystal substrate, the third electrode being transparent to light. The third electrode is arranged so as to overlap the second waveguide in the thickness direction of the photonic crystal layer.

According to the embodiment of the present invention, there can be achieved the waveguide device, the optical scanning device, and the optical modulation device, each of which has a large scan angle, is quickly responsive, can be downsized, and can be reduced in driving voltage.

DESCRIPTION OF THE EMBODIMENTS

A waveguide device according to an embodiment of the present invention is an optical device including a line-defect optical waveguide. Examples of the waveguide device include an optical scanning device for scanning an object with light at a wide angle, an optical modulation device for changing the phase of light, an optical delay device, and an optical switch.

In particular, the waveguide device is suitably used as an optical scanning device or an optical modulation device. Embodiments as an optical scanning device are illustrated in FIG. 1 to FIG. 5. An embodiment as an optical modulation device is illustrated in FIG. 6.

Embodiments of the present invention are described below. However, the present invention is not limited to these embodiments. The term "left side" or "right side" as used herein means a left side or a right side with respect to the waveguide direction of an optical waveguide (direction in which light travels in the optical waveguide).

A. Overall Configuration and Operation of Optical Scanning Device

A-1. Overall Configuration

Figure 1:
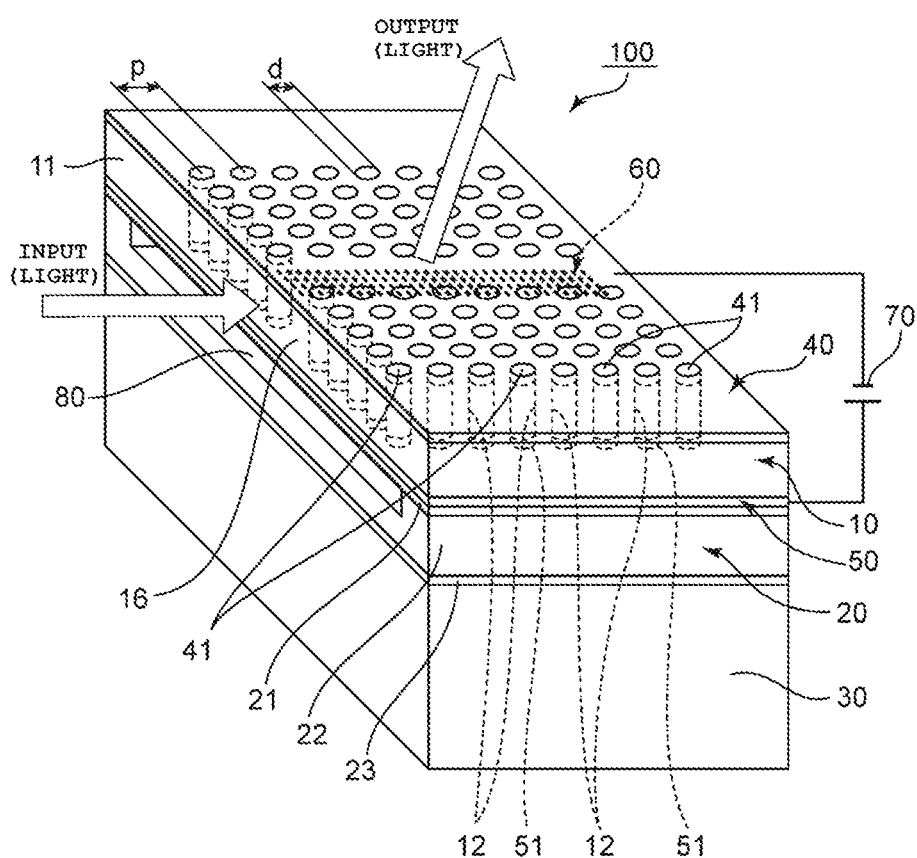
FIG. 1 is a schematic perspective view of an optical scanning device according to one embodiment of the present invention.
Figure 2:
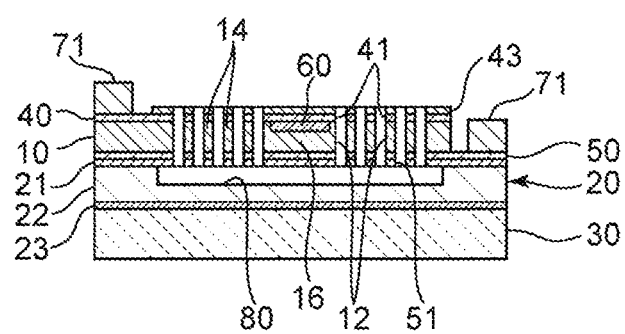
FIG. 2 is a schematic sectional view of the optical scanning device of FIG. 1.

FIG. 1 is a schematic perspective view of an optical scanning device according to one embodiment of the present invention, and FIG. 2 is a schematic sectional view of the optical scanning device of FIG. 1. An optical scanning device 100 of the illustrated example includes: a photonic crystal layer 10 having holes 12 periodically formed in an electro-optical crystal substrate 11; an optical waveguide 16 defined as a portion in the photonic crystal layer 10 where the holes 12 are not formed (i.e., serving as a line defect formed in the photonic crystal layer); a first electrode 40 arranged above the electro-optical crystal substrate 11 (photonic crystal layer), the first electrode 40 being transparent to light; and a second electrode 50 arranged below the electro-optical crystal substrate 11 (photonic crystal layer). Each of the first electrode 40 and the second electrode 50 overlaps the optical waveguide 16 in the thickness direction of the photonic crystal layer 10. The optical scanning device 100 typically further includes a diffraction grating 60 arranged in at least one portion selected from an upper portion, a left side surface portion, and a right side surface portion of the optical waveguide 16. The optical scanning device 100 is configured so that the emission angle of light emitted from the upper surface of the optical waveguide is changed.

In the optical scanning device, an electric field is generated in the optical waveguide by a voltage applied between the first electrode and the second electrode to change the emission angle of emitted light from the optical waveguide. Accordingly, the optical waveguide needs to be positioned between the first electrode and the second electrode. In view of this, the following configuration is considered: on the upper surface of the electro-optical crystal substrate (photonic crystal layer), the first electrode is arranged on the right side of the optical waveguide, and the second electrode is arranged on the left side of the optical waveguide. However, in the configuration in which both of the first electrode and the second electrode are arranged on the upper surface of the electro-optical crystal substrate, an interval between the first electrode and the second electrode cannot be made smaller than the width of the optical waveguide (dimension thereof in a direction perpendicular to the waveguide direction), and hence there is a limitation on the reduction of the interval between the first electrode and the second electrode.

In contrast, according to the configuration described above, the first electrode and the second electrode are arranged above and below the electro-optical crystal substrate (photonic crystal layer) so as to overlap the optical waveguide in the thickness direction of the photonic crystal layer. Accordingly, the interval between the first electrode and the second electrode can be reduced as compared to the mode in which the first electrode and the second electrode are arranged on the upper surface of the electro-optical crystal substrate.

More specifically, the interval between the first electrode 40 and the second electrode 50 in the thickness direction of the photonic crystal layer is typically 1.2 µm or less, preferably less than 1 µm, more preferably 0.8 µm or less, still more preferably 0.5 µm or less, and is typically 0.2 µm or more.

The interval between the first electrode and the second electrode can be reduced as described above, and hence the first electrode and the second electrode can be arranged near the optical waveguide. Accordingly, an electric field can be efficiently generated in the optical waveguide at the time of the application of a voltage between the first electrode and the second electrode, and hence a reduction in driving voltage of the optical scanning device required for the emission of light at a desired emission angle can be achieved.

The first electrode 40 is typically brought into contact with the upper surface of the electro-optical crystal substrate 11. In the optical scanning device 100 of the illustrated example, the first electrode 40 is arranged over the entirety of the upper surface of the electro-optical crystal substrate 11. In one embodiment, the second electrode 50 is transparent to light, and is brought into contact with the lower surface of the electro-optical crystal substrate 11. In the optical scanning device 100, the second electrode 50 is arranged over the entirety of the lower surface of the electro-optical crystal substrate 11. The refractive index of each of the first electrode 40 and the second electrode 50 is lower than the refractive index of the electro-optical crystal substrate 11. According to such configuration, the first electrode and the second electrode can each be caused to function as a clad layer, and hence light propagating in the optical waveguide can be suppressed from leaking out of the optical waveguide.

The refractive index of the electrode (the first electrode 40 or the second electrode 50) is typically 1.1 or more, preferably 1.3 or more, and is typically 2.0 or less, preferably 1.8 or less.

A refractive index difference between the electro-optical crystal substrate and the electrode is typically 0.2 or more, preferably 0.3 or more, and is typically 1.2 or less, preferably 0.8 or less.

At the time of the operation of the optical scanning device 100, a power source 70 is electrically connected to the first electrode 40 and the second electrode 50. Accordingly, as illustrated in FIG. 2, each of the first electrode 40 and the second electrode 50 may have arranged thereon a metal pad 71 to be electrically connected to the power source 70. In addition, a protective layer 43 for protecting the first electrode 40 may be arranged on the upper surface of the first electrode 40. Any appropriate configuration may be adopted as the protective layer 43 as long as emitted light from the optical waveguide 16 can be allowed to pass therethrough.

In one embodiment, the optical scanning device 100 further includes: a substrate 30 arranged below the second electrode 50; and a low-refractive index portion 80 positioned between the second electrode 50 and the substrate 30, the low-refractive index portion 80 having a refractive index lower than the refractive index of the electro-optical crystal substrate 11 (low-dielectric constant portion 80 having a dielectric constant lower than the dielectric constant of the electro-optical crystal substrate 11). The low-refractive index portion 80 overlaps the optical waveguide 16 in the thickness direction of the photonic crystal layer 10. When the substrate is arranged, the strength of the optical scanning device can be improved. In addition, when the low-refractive index portion is arranged so as to overlap the optical waveguide, light propagating in the optical waveguide can be stably suppressed from leaking out of the optical waveguide.

The optical scanning device 100 of the illustrated example may further include a joining portion 20 arranged between the second electrode 50 and the substrate 30 to join the second electrode 50 and the substrate 30. The joining portion 20 has a cavity 80 that functions as the low-refractive index portion. The cavity 80 is typically an opening penetrating through the joining portion 20 in the waveguide direction. The cavity may be defined by the lower surface of the second electrode, the upper surface of the substrate, and the joining portion.

Any appropriate configuration may be adopted as the diffraction grating 60 as long as light can be emitted from the upper surface of the optical waveguide 16. For example, the diffraction grating may be flat, may be uneven, or may utilize a hologram. In the case of a flat diffraction grating, the pattern of the diffraction grating is formed by, for example, a refractive index difference, and in the case of an uneven diffraction grating, the pattern of the diffraction grating is formed by, for example, a groove or a slit. Typical examples of the pattern of the diffraction grating include a stripe, a lattice, a dot, and a specific shape (e.g., a star shape). The directions and pitch of the stripes, the arrangement pattern of the dots, and the like may be appropriately set in accordance with purposes. In one embodiment, the diffraction grating 60 has a plurality of grating grooves extending in a direction substantially perpendicular to the waveguide direction of the optical waveguide 16. That is, in one embodiment, the diffraction grating has a stripe pattern substantially perpendicular to the waveguide direction of the optical waveguide.

The diffraction grating 60 may be formed over the entirety in the waveguide direction of the optical waveguide 16, or may be formed in a predetermined region along the waveguide direction of the optical waveguide 16. The number of the predetermined regions may be one, or two or more. The ratio of the length of the diffraction grating to the length of the optical waveguide is preferably from 10% to 90%, more preferably from 20% to 80%. When the ratio of the length falls within such ranges, the transverse mode shape of light can be stabilized in a portion in the optical waveguide where the diffraction grating is not arranged. Thus, the light can be satisfactorily emitted from the upper surface of the optical waveguide by a diffraction effect in the diffraction grating region. In addition, a diffracted light pattern having satisfactory symmetry can be achieved, and hence emitted light that has a smooth intensity distribution and is free of any ripple can be obtained. The formation position of the diffraction grating in the lengthwise direction of the optical waveguide may be appropriately set in accordance with purposes. The formation position of the diffraction grating may be determined in accordance with, for example, a circuit to which the optical scanning device is connected and a method for the bonding therebetween.

The diffraction grating 60 may be preferably arranged only directly above the optical waveguide 16 (the diffraction grating may be formed on the electro-optical crystal substrate, or may be formed separately from the electro-optical crystal substrate, or both of these actions may be performed simultaneously).

Further, separately from low-refractive index pillars or holes for forming photonic crystals, there may be formed low-refractive index pillars or holes of a different period in the electro-optical crystal substrate.

With such configuration, the diffraction grating and guided light can effectively interact with each other, and as a result, extremely excellent diffraction efficiency can be achieved.

Figure 3:
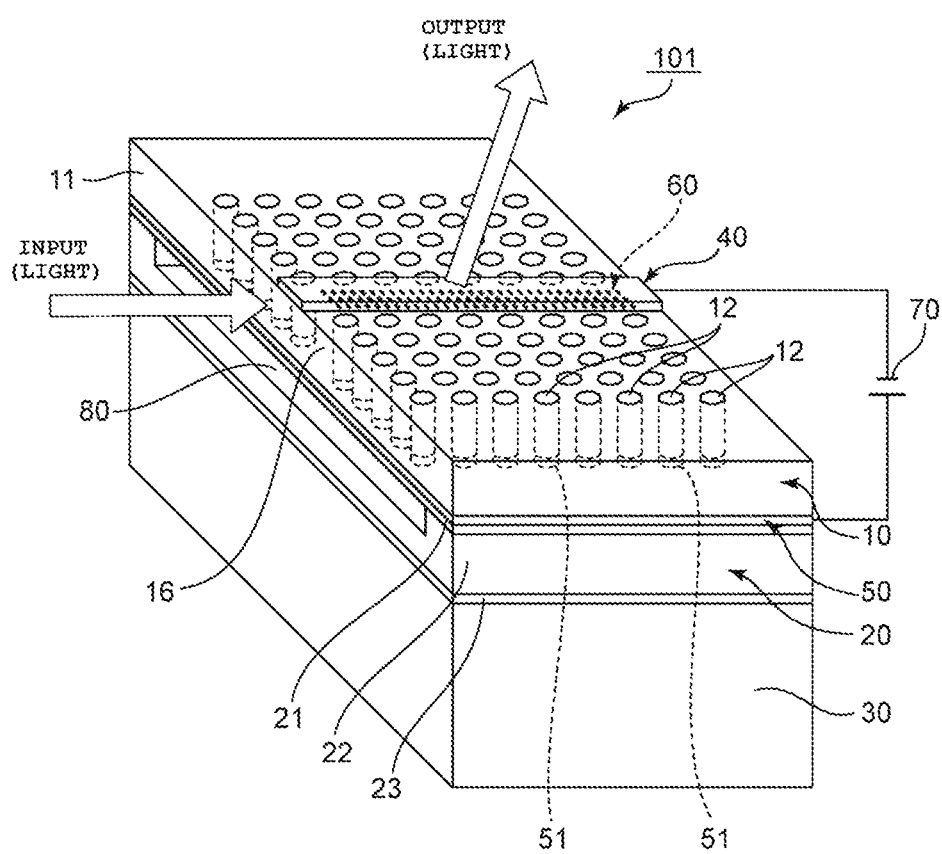
FIG. 3 is a schematic perspective view of an optical scanning device according to another embodiment of the present invention.

FIG. 3 is a schematic perspective view of an optical scanning device according to another embodiment of the present invention. In an optical scanning device 101 of the illustrated example, the first electrode 40 is arranged only directly above the optical waveguide 16. In other words, the first electrode 40 is arranged only in a portion on the upper surface of the electro-optical crystal substrate 11 corresponding to the optical waveguide 16.

Figure 4:
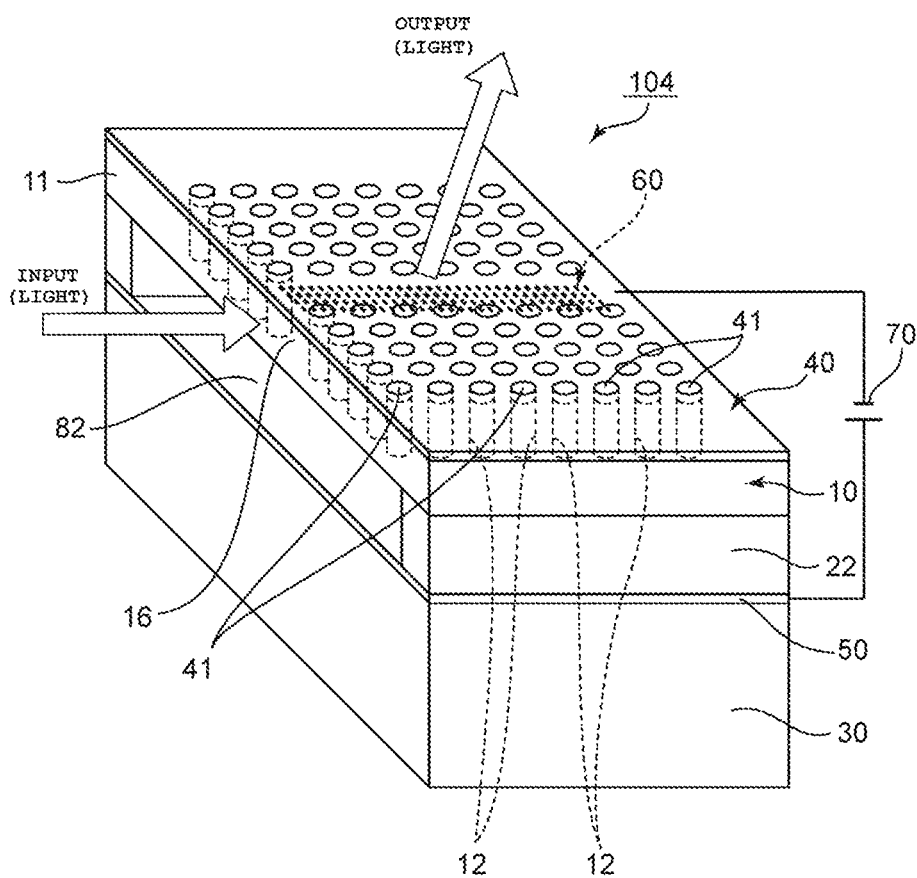
FIG. 4 is a schematic perspective view of an optical scanning device according to still another embodiment of the present invention.
Figure 5:
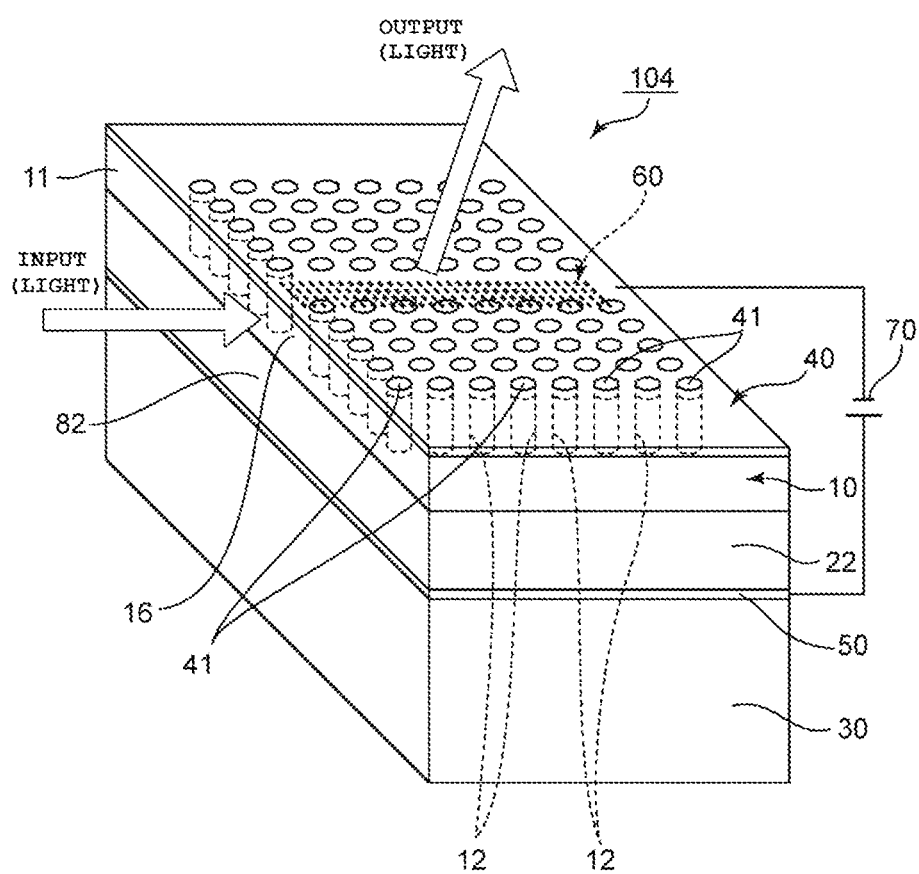
FIG. 5 is a schematic perspective view of an optical scanning device according to still another embodiment of the present invention.
Figure 6:
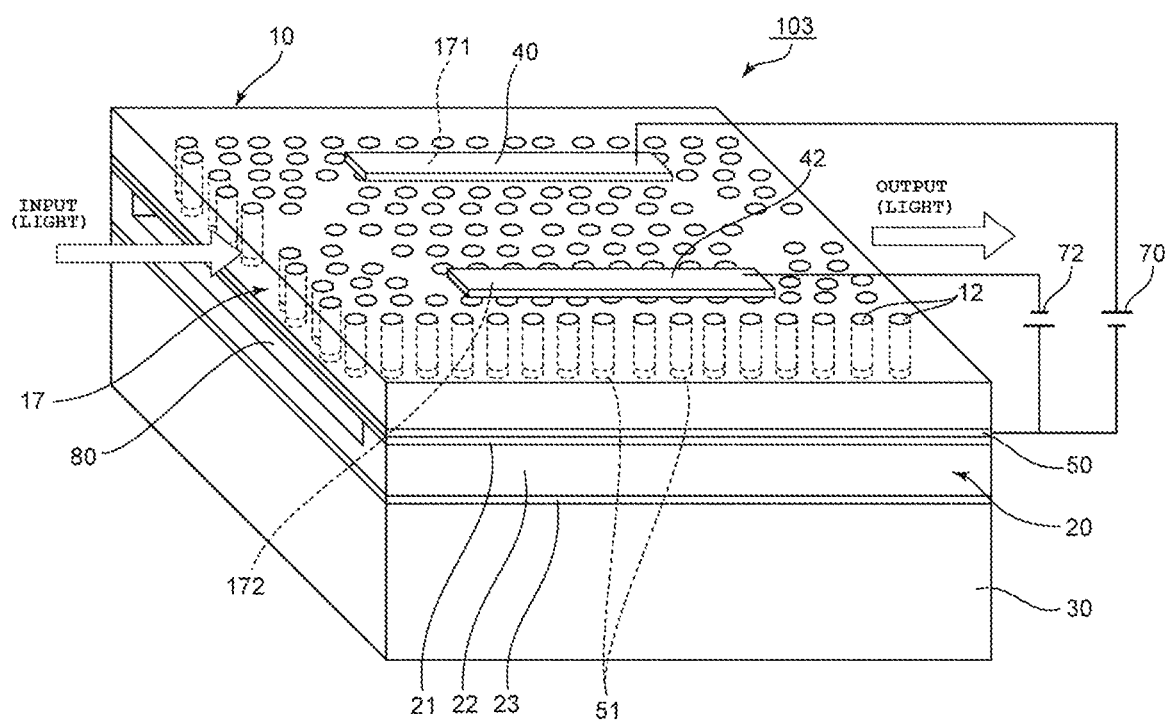
FIG. 6 is a schematic perspective view of an optical modulation device according to still another embodiment of the present invention.

FIG. 4 and FIG. 5 are each a schematic perspective view of an optical scanning device according to still another embodiment of the present invention. In an optical scanning device 104 of each of the illustrated examples, a cavity-processing layer 22 is arranged between the electro-optical crystal substrate 11 and the second electrode 50 to join the electro-optical crystal substrate 11 and the second electrode 50 to each other. In addition, a low-refractive index portion 82 is positioned between the electro-optical crystal substrate 11 and the second electrode 50. In this case, the second electrode 50 may be transparent to light, or may be opaque to light.

In one embodiment, as illustrated in FIG. 4, the low-refractive index portion is a cavity 82. The cavity 82 is typically defined by the lower surface of the electro-optical crystal substrate 11, the upper surface of the second electrode 50, and the cavity-processing layer 22. The cavity may be an opening penetrating through the joining portion in the waveguide direction. In addition, in one embodiment, as illustrated in FIG. 5, the cavity-processing layer 22 may function as the low-refractive index portion.

In the case of FIG. 4, a protective layer 21 and an amorphous layer 23 may be present above and below the cavity-processing layer 22. In the case of FIG. 5, the amorphous layer 23 may be present above and below the cavity-processing layer 22.

The term "optical scanning device" as used herein encompasses both of a wafer (optical scanning device wafer) having formed thereon at least one optical scanning device and a chip obtained by cutting the optical scanning device wafer.

First, the operation of the optical scanning device is described, and specific configurations of the respective constituents of the optical scanning device and a production method therefor are described later in the section B to the section H. Further, the optical modulation device is described later in the section I.

A-2. Operation

Figure 7:
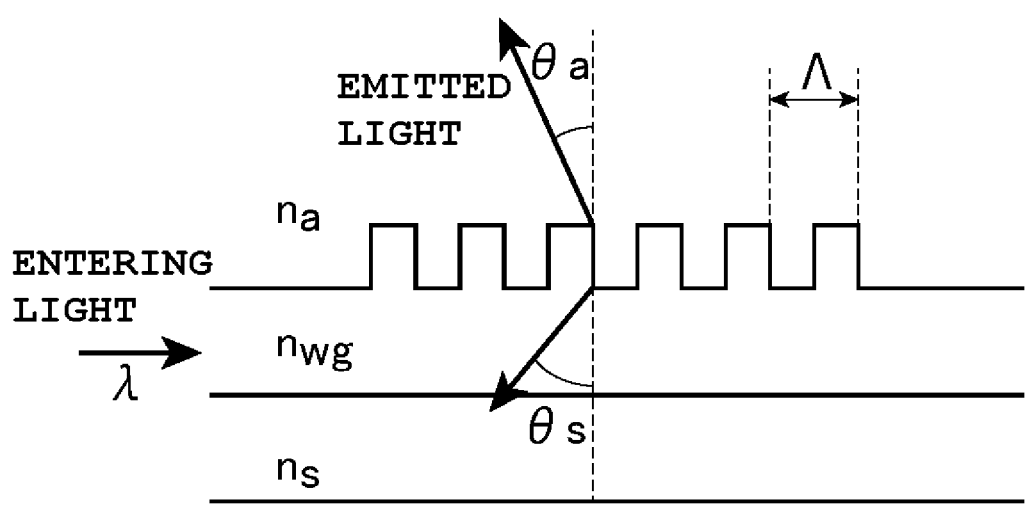
FIG. 7 is a schematic sectional view for illustrating the propagation and emission (radiation) of light in a diffraction grating that may be used in the optical scanning device according to the embodiment of the present invention.

At the time of the operation of the optical scanning device, light is caused to enter from the entering surface of the optical waveguide 16. Herein, the entering light is described. Laser light oscillating at a single wavelength, the laser light being used for LiDAR, may be used as the entering light. The longitudinal mode of the laser light may be a multimode or a single mode, and the transverse mode thereof may be a multimode or a single mode. Each of the longitudinal mode and transverse mode of the laser light is preferably a single mode. Such configuration can suppress the spread of the laser light, and hence can improve a spatial resolution. While the entered light propagates in the optical waveguide 16, diffracted light is emitted from the upper surface of the device by the action of the diffraction grating 60. The action is described in more detail with reference to FIG. 7. FIG. 7 is a schematic sectional view for illustrating the propagation and emission (radiation) of the light in the diffraction grating. In one embodiment, as described above, the diffraction grating has the plurality of grating grooves extending in the direction substantially perpendicular to the waveguide direction of the optical waveguide 16. The diffraction grating of the illustrated example is a grating pattern in a direction perpendicular to the direction of the waveguide in plan view, and in a section along the direction of the waveguide, for example, a protruding portion having a width of $\Lambda/2$ and a slit having a width of $\Lambda/2$ are alternately formed. In the slit portion, the optical waveguide below the diffraction grating is exposed. The width $\Lambda$ of a repeating unit formed of the protruding portion and the slit is defined as the period (pitch) of the diffraction grating. A ratio between the width of the protruding portion and the width of the slit is not particularly limited, and preferably falls within the range of from 1/9 to 9/1. The light that has entered the optical waveguide 16 propagates in the waveguide direction at, for example, a propagation constant $\beta_0$. In the diffraction grating having the period $\Lambda$, light having a propagation constant satisfying a phase condition represented by the following equation (1) propagates:

$$\beta_q = \beta_0 + qk \quad (q=0,\pm1,\pm2,\dots) \tag{1}$$

where $\beta_0$ represents the propagation constant of a waveguide mode in the optical waveguide when no diffraction grating is present, and K is represented by the following equation.

$$K = 2\pi/\Lambda$$

When an order "q" satisfying the following formula is present, the light may be emitted (radiated) toward both the upper side and lower side of the optical waveguide:

$$|\beta_q| < n_a \cdot k \text{ or } |\beta_q| < n_s \cdot k$$

where $n_a$ and $n_s$ represent the refractive indices of the upper clad and lower clad of the optical waveguide, respectively, and "k" represents a wavenumber. In the optical scanning device, the second electrode and/or the cavity functions as the lower clad, and the first electrode and/or an external environment (air portion) above the first electrode functions as the upper clad, and hence $n_a$ and $n_s$ may each represent 1.5.

Emission angles $\theta_a$ and $\theta_s$ with respect to a reference surface may each be determined from the following equation (2). A surface including the waveguide direction of the optical waveguide 16 as a normal is set to the reference surface (the reference surface also includes the normal of the photonic crystal layer 10).

$$n_a \cdot k \cdot \sin \theta_a = n_s \cdot k \cdot \sin \theta_s = \beta_q \quad (2)$$

Further, the equation (1) may be represented as the following equation (3). Herein, the condition under which the equation (3) is actually valid is a case in which $q \leq -1$. Accordingly, first-order diffracted light may be emitted to the outside of the optical waveguide at the emission angles $\theta_a$ and $\theta_s$ calculated when $q=-1$.

$$n_{wg} \cdot \frac{2\pi}{\lambda} + \frac{2\pi}{\Lambda} q = n_a \cdot \frac{2\pi}{\lambda} \cdot \sin \theta_a \quad (3)$$
$$= n_s \cdot \frac{2\pi}{\lambda} \cdot \sin \theta_s$$

$q$: diffraction order

As is apparent from the equation (3), the emission angles $\theta_a$ and $\theta_s$ may change with $n_{wg}$ and the wavelength $\lambda$ of the entering light. Herein, the $n_{wg}$ corresponds to the equivalent refractive index of light propagating in an optical waveguide (line-defect optical waveguide) formed by removing the holes corresponding to one row in the photonic crystal. According to the embodiment of the present invention, when the photonic crystal (photonic crystal layer) is formed in the electro-optical crystal substrate, the equivalent refractive index becomes extremely large at longer wavelengths of a photonic band, and the equivalent refractive index is largely changed by applying a voltage. As a result, the change of (an electric field to be formed by) the applied voltage can largely change the $n_{wg}$ in the equation (3), and hence can largely change the emission angle $\theta_a$. In other words, the change of the applied voltage can change the emission angle $\theta_a$ in a wide range and to a desired angle. Further, the photonic crystal based on the electro-optical crystal substrate has the following advantage over a photonic crystal based on a semiconductor (e.g., monocrystalline silicon). The photonic crystal formed from the semiconductor has a small electro-optical effect, and hence its refractive index is hardly changed even when a voltage is applied thereto. Accordingly, when an attempt is made to change an emission angle in an optical scanning device utilizing such photonic crystal, there is a need to change the wavelength of entering light or to heat the device to change its refractive index. As a result, when the wavelength is changed, a plurality of light sources having different wavelengths are, or a multiple wavelength light source is, required. Thus, cost for the device increases, and a constraint on the design thereof becomes larger. Further, it is difficult to continuously change the wavelength of a light source, and hence it is also difficult to continuously change the emission angle. In addition, some wavelengths of the light source may preclude the achievement of a desired emission angle. In addition, when the heating is performed, it is difficult to uniformize the temperature distribution of the photonic crystal portion and to make the device quickly responsive. In addition, temperature control when an environmental temperature changes requires an external circuit including a sensor, and hence an increase in cost becomes a problem. Further, a change in equivalent refractive index with a temperature change is relatively small, and a change in emission angle of more than 50° has not been reported at present. In contrast, according to the embodiment of the present invention, a voltage to be applied between the electrodes only needs to be changed, and the voltage can be continuously changed. Accordingly, there can be achieved an optical scanning device, which is available at low cost, can be designed with a small constraint, and can change an emission angle in a wide range and to a desired angle.

Figure 8:
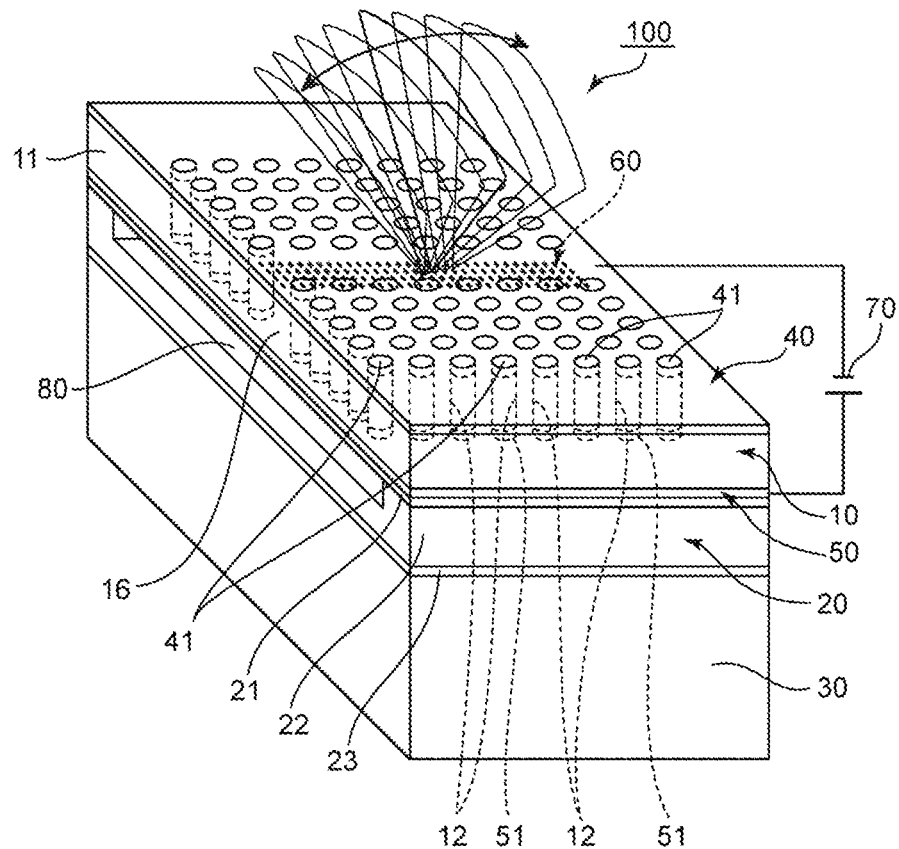
FIG. 8 is a schematic perspective view for illustrating the manner in which emitted light beams emitted from the optical scanning device according to the embodiment of the present invention spread.

FIG. 8 is a schematic perspective view for illustrating the manner in which emitted light beams emitted from the optical scanning device spread. As illustrated in FIG. 8, the emitted light beams (laser light) emitted from the optical scanning device (substantially, the optical waveguide) via the above-mentioned mechanism become so-called fan beams that are line shapes in plan view (line shapes in a direction perpendicular to an optical waveguide direction) and are a fan shape when viewed from the optical waveguide direction. The angle of the fan (the spread angle of the fan beams) is preferably 10° or more, more preferably 25° or more, still more preferably 50° or more. The spread angle of the fan beams may be, for example, 120° or less. The spread angle of the fan beams may be controlled by adjusting the width of the optical waveguide. In other words, as in a relationship between a near field and a far field, the narrowing of the width of the optical waveguide enlarges the spread, and hence can enlarge the spread angle. In addition, in contrast, the widening of the width of the optical waveguide can narrow the spread angle. When the spread angle falls within such ranges, an optical scanning device having extremely excellent scanning efficiency can be achieved by a synergistic effect with the following effect: the emission angle can be changed in a wide range. In particular, an optical scanning device for LiDAR has been required to have an angle of view of 100° or more in a horizontal direction and an angle of view of 25° or more in a vertical direction. To satisfy the requirement, the spread angle of the fan beams (in the vertical direction) may be set as described above. In addition, the emission angle can be preferably changed in the range of ±40° or more, and can be more preferably changed in the range of ±60° or more. The emission angle may be, for example, ±70° or less. As described above, according to the embodiment of the present invention, the emission angle can be changed in a range much wider than that of a related-art optical scanning device. In this description, the sign "+" of the emission angle means an output side with respect to the above-mentioned reference surface, and the sign "−" thereof means an input side with respect to the reference surface.

Figure 9:
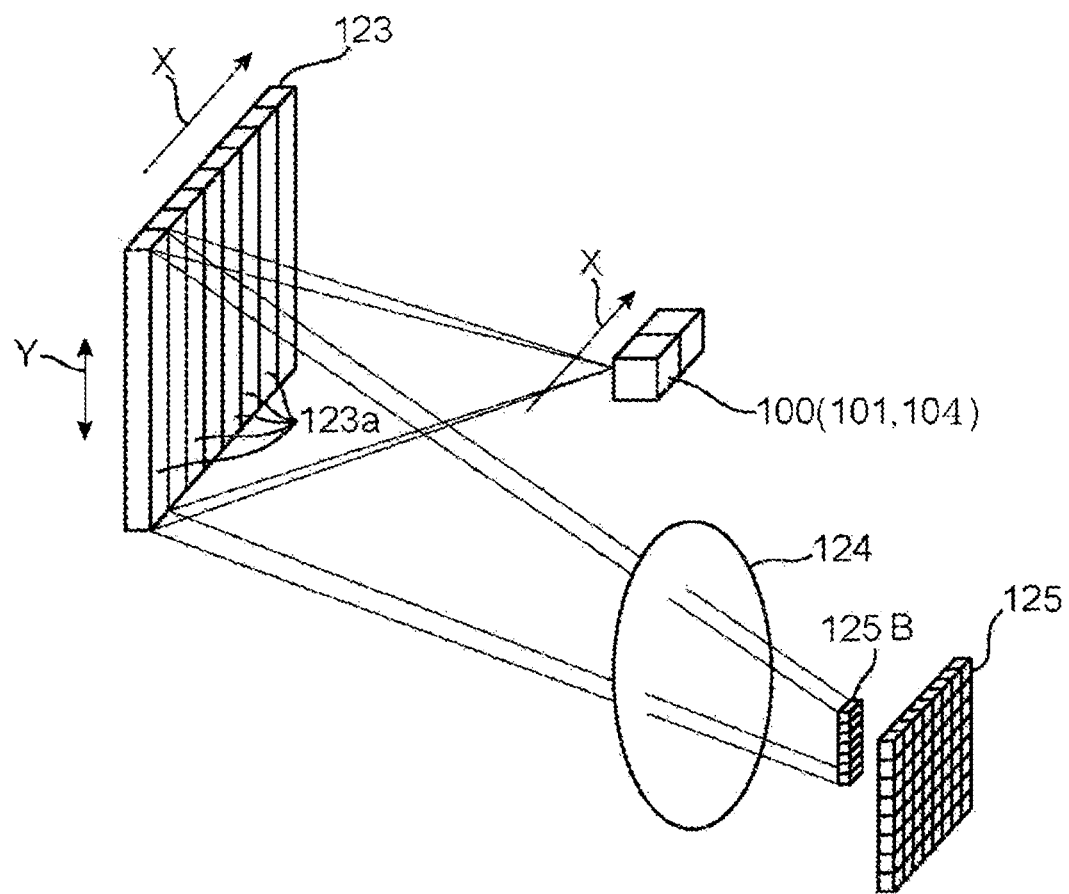
FIG. 9 is a conceptual view for illustrating a method of scanning an object surface with the optical scanning device according to the embodiment of the present invention.

Next, an example of a method of using the optical scanning device is described. FIG. 9 is a conceptual view for illustrating a method of scanning an object surface with the optical scanning device. As described above, when a voltage to be applied to the optical scanning device according to the embodiment of the present invention is changed, light (fan beams) spreading in the direction perpendicular to the optical waveguide direction can be extracted at an extremely wide range of emission angles with respect to the surface (reference surface) that includes a normal with respect to the optical scanning device and is perpendicular to the optical waveguide direction. Accordingly, when the optical waveguide direction of the optical scanning device (specifically, any of optical scanning devices 100, 101, and 104) is caused to coincide with a horizontal direction X, fan beams spreading in a vertical direction Y can be extracted. In a surface to be measured (object surface) 123, when the fan beams are projected onto the foremost row out of the rows 123a of the object surface in the illustrated example, reflected light from the row can be condensed with a lens 124 and received with the light-receiving device array 125B of light-receiving devices 125. Next, according to the optical scanning device according to the embodiment of the present invention, a change in voltage to be applied thereto can largely change the emission angle of each of the fan beams along the horizontal direction X. As a result, when the emission angle is changed at a predetermined angle, the fan beams can be projected onto the next row (row next to the row onto which the fan beams have been projected). Accordingly, the entirety of the object surface 123 can be scanned without movement of the optical scanning device along the horizontal direction X. As a result, time and cost for the scanning can be significantly reduced as compared to the conventional ones, and cost for the light-receiving device array can be significantly reduced as compared to the conventional one. The light-receiving devices may be, for example, two-dimensionally arrayed photodiodes, CMOS cameras, or CCDs.

B. Photonic Crystal Layer

B-1. Electro-Optical Crystal Substrate

Figure 14:
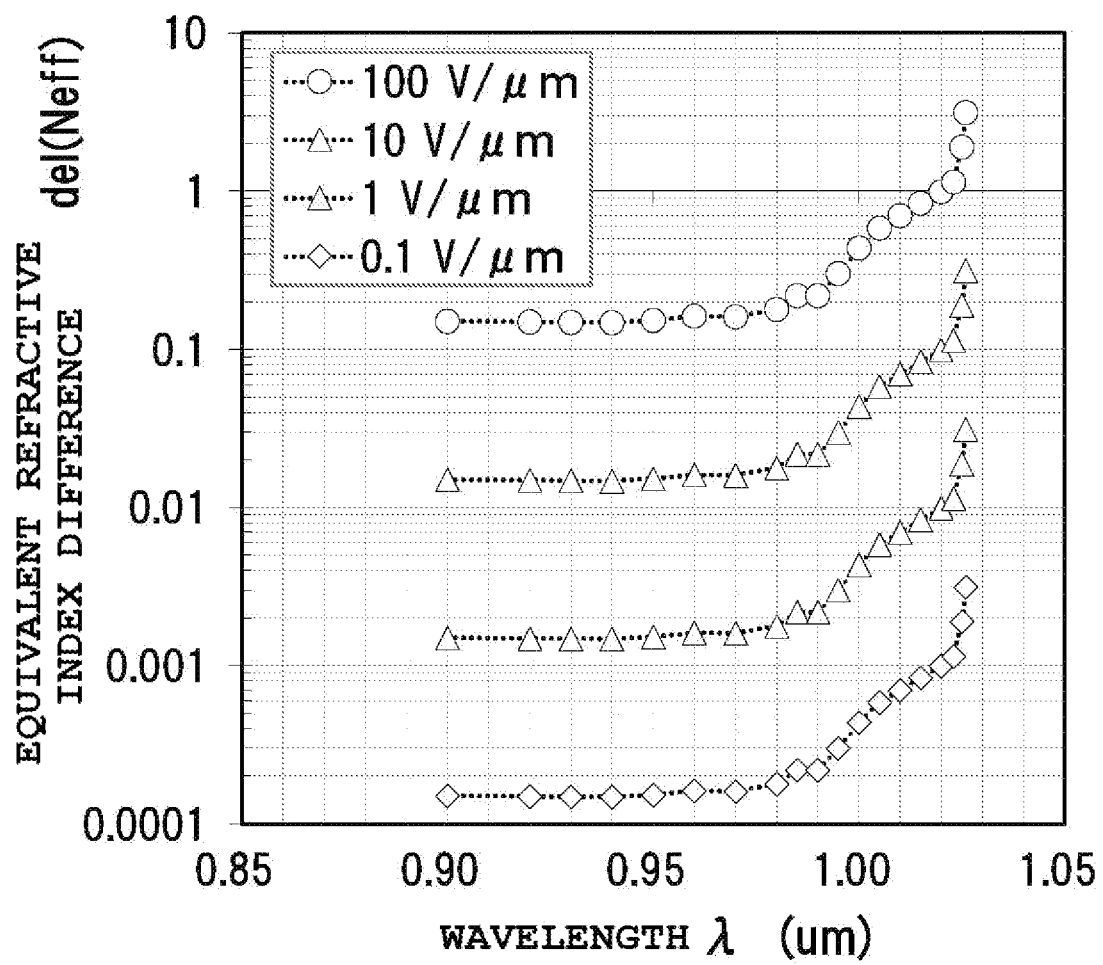
FIG. 14 is a graph for showing the wavelength dependence of an equivalent refractive index difference.

The electro-optical crystal substrate 11 includes an upper surface on the first electrode 40 side and a lower surface on the second electrode 50 side. The electro-optical crystal substrate 11 includes the crystal of a material having an electro-optical effect. Specifically, the application of a voltage (electric field) to the electro-optical crystal substrate 11 may change its refractive index. Accordingly, the following advantage can be obtained as compared to a case in which a semiconductor material (e.g., monocrystalline silicon) is used in an optical scanning device. In the optical scanning device using the semiconductor material, the enlarging effect of a photonic crystal on the wavelength dependence of an equivalent refractive index is utilized. Alternatively, the enlarging effect thereof on the temperature dependence of the equivalent refractive index is utilized. In the former case, however, the wavelength dependence is enlarged by the photonic crystal, and hence fan beams are emitted at angles varying from wavelength to wavelength. Accordingly, the following problems may occur: light sources having a plurality of wavelengths are required; and signal processing is performed by independently recognizing the plurality of wavelengths on a light-receiving side, and hence the processing becomes complicated. In the latter case, some degree of time is required for heating and cooling the photonic crystal portion to set its temperature to a desired value and to uniformize its in-plane distribution, and hence it is difficult to increase the response speed of the device. In addition, temperature control when an environmental temperature changes requires an external circuit including a sensor, and hence an increase in cost becomes a problem. Further, a change in equivalent refractive index with a temperature change is relatively small. In contrast, when the electro-optical crystal substrate is used, as described above, the application of a voltage (electric field) thereto can change an equivalent refractive index. A difference in equivalent refractive index of light propagating in an optical waveguide arranged in the photonic crystal is shown in FIG. 14. In FIG. 14, calculation results when lithium niobate is used as the electro-optical crystal substrate, and its hole period and hole radius are set to 425 nm and 144.5 nm, respectively, are shown. As shown in FIG. 14, the equivalent refractive index difference becomes larger at longer wavelengths in a photonic band. Herein, the term "longer wavelengths" means wavelengths longer than the central wavelength of the photonic band, or wavelengths longer than the wavelength of a photonic band confinement mode. In addition, in the region, the wavelength dependence of the equivalent refractive index difference also becomes larger. When a voltage is applied to the electro-optical crystal substrate, the equivalent refractive index difference may also become larger together with a change in refractive index thereof by its electro-optical effect. An equivalent refractive index difference $\Delta N_{\textit{eff}}$ in FIG. 14 is represented by the following equation where $\Delta N_{\textit{eff}}(0)$ represents an equivalent refractive index when no voltage is applied, and $N_{\textit{eff}}(V)$ represents an equivalent refractive index when a voltage is applied.

$$\Delta N_{\textit{eff}} = N_{\textit{eff}}(V) - N_{\textit{eff}}(0)$$

Figure 15:
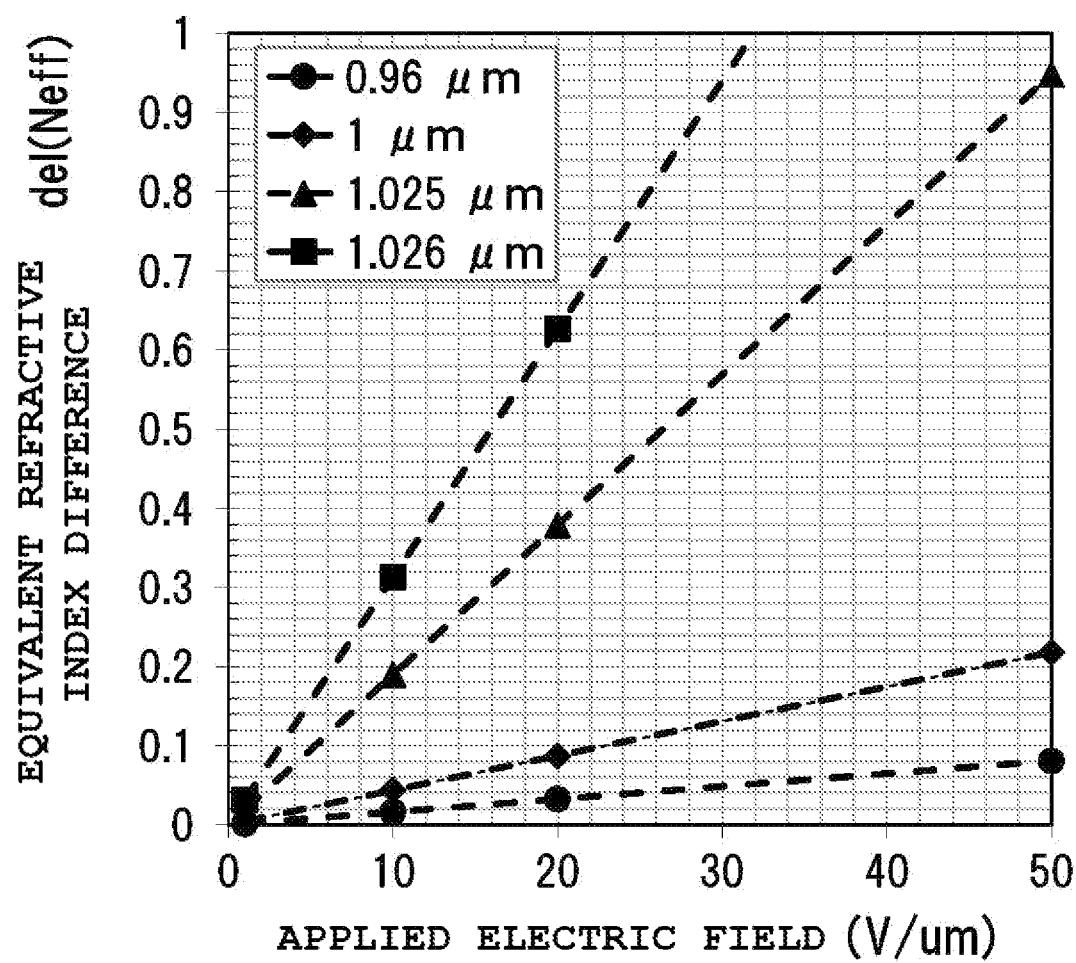
FIG. 15 is a graph for showing relationships between the equivalent refractive index difference and an applied voltage (electric field) at different wavelengths.

FIG. 15 is a graph for showing relationships between an applied electric field and the equivalent refractive index difference at specific wavelengths, the graph being obtained from the calculation results of FIG. 14. As shown in FIG. 15, in a region where a wavelength λ is short, a change in equivalent refractive index difference with the electric field is extremely small as in an optical waveguide diffraction device in which no photonic crystal is formed. Meanwhile, in a photonic band end region where the wavelength λ is long, the change in equivalent refractive index difference with the electric field may be large. Thus, the photonic crystal utilizing the electro-optical crystal substrate can enlarge the equivalent refractive index difference (largely change the equivalent refractive index) through voltage application, and hence can largely change the emission angle of diffracted light in correspondence with the change.

The c-axis of the electro-optical crystal substrate 11 may be typically perpendicular to the electro-optical crystal substrate 11. That is, the electro-optical crystal substrate 11 is typically a Z-cut substrate. The thickness of the electro-optical crystal substrate 11 may be set to any appropriate thickness depending on the frequency and wavelength of an electromagnetic wave to be used. The thickness of the electro-optical crystal substrate 11 may be, for example, from 0.1 μm to 10 μm, or for example, from 0.1 μm to 3 μm. Typically, as described above, in the optical scanning device, the electro-optical crystal substrate is integrated with the support substrate, and is hence reinforced by the support substrate. Accordingly, the thickness of the electro-optical crystal substrate can be reduced. As a result, light having a wavelength suitable for the optical scanning device can be propagated in the optical waveguide in a single mode, and/or the efficiency with which the light is coupled with the diffraction grating can be easily improved.

Any appropriate material may be used as a material for forming the electro-optical crystal substrate 11 as long as the effects achieved in the embodiment of the present invention can be obtained. As such material, there is typically given a dielectric material (for example, a ceramic). Specific examples thereof include lithium niobate ($LiNbO_3$: LN), lithium tantalate ($LiTaO_3$: LT), potassium titanate phosphate ($KTiOPO_4$: KTP), potassium lithium niobate ($K_xLi_{(1-x)}NbO_2$: KLM), potassium niobate ($KNbO_3$: KN), potassium tantalate niobate ($KNb_xTa_{(1-x)}O_3$: KTN), and a solid solution of lithium niobate and lithium tantalate. When lithium niobate or lithium tantalate is used, lithium niobate or lithium tantalate doped with MgO, or the crystal thereof having stoichiometric composition may be used for suppressing optical damage.

B-2. Photonic Crystal Layer

As described above, the photonic crystal layer 10 has the holes 12 periodically formed in the electro-optical crystal substrate. A photonic crystal for forming the photonic crystal layer is a multidimensional periodic structural body formed by arranging a medium having a large refractive index and a medium having a small refractive index at a period comparable to the wavelength of light, and has the band structure of light similar to the band structure of an electron. Accordingly, appropriate design of the periodic structure can express a forbidden band (photonic band gap) for predetermined light. A photonic crystal having a forbidden band functions as an object that neither reflects nor transmits light having a predetermined wavelength. The introduction of a line defect that disturbs periodicity into the photonic crystal having a photonic band gap results in the formation of a waveguide mode in the frequency region of the band gap, and hence can achieve an optical waveguide that propagates light with a low loss.

The photonic crystal of the illustrated example is a so-called slab two-dimensional photonic crystal. The slab two-dimensional photonic crystal refers to a photonic crystal obtained by: arranging, on a thin-plate slab made of a dielectric material (in the embodiment of the present invention, the electro-optical crystal material), circular columnar or polygonal columnar low-refractive index pillars each having a refractive index lower than the refractive index of the material for forming the thin-plate slab at appropriate two-dimensional periodic intervals in accordance with purposes and a desired photonic band gap; and sandwiching the upper and lower portions of the thin-plate slab between an upper clad and a lower clad each having a refractive index lower than that of the thin-plate slab. In the illustrated example, the holes 12 function as the low-refractive index pillars, a portion 14 between the holes 12 and 12 of the electro-optical crystal substrate 11 functions as a high-refractive index portion, the second electrode and/or the cavity functions as the lower clad, and the first electrode and/or an external environment (air portion) above the first electrode functions as the upper clad. A portion in the electro-optical crystal substrate 11 where the periodic pattern of the holes 12 is not formed serves as a line defect, and the line defect portion forms the optical waveguide 16.

As described above, the holes 12 may be formed as a periodic pattern. The holes 12 are typically arrayed so as to form regular lattices. Any appropriate form may be adopted as the form of each of the lattices as long as a predetermined photonic band gap can be achieved. Typical examples thereof include a triangular lattice and a square lattice. In one embodiment, the holes 12 may be through-holes. The through-holes are easy to form, and as a result, their refractive indices are easy to adjust. Any appropriate shape may be adopted as the plan-view shape of each of the holes (through-holes). Specific examples thereof include equilateral polygons (e.g., an equilateral triangle, a square, an equilateral pentagon, an equilateral hexagon, and an equilateral octagon), a substantially circular shape, and an elliptical shape. Of those, a substantially circular shape is preferred. The ratio of the long diameter of the substantially circular shape to the short diameter thereof is preferably from 0.90 to 1.10, more preferably from 0.95 to 1.05. As described above, the through-holes 12 may be low-refractive index pillars (pillar-shaped portions each including a low-refractive index material). However, the through-holes are easier to form, and the through-holes each include air having the lowest refractive index. Accordingly, a difference in refractive index between each of the through-holes and the optical waveguide can be made larger. In addition, part of hole diameters may be different from the other hole diameters, and part of hole periods may also be different from the other hole periods. In addition, a relationship between the hole period P and the radius d/2 of each of the holes is as follows: the ratio "d/(2P)" is preferably 0.2 or more and 0.48 or less, more preferably 0.25 or more and 0.4 or less, still more preferably 0.3 or more and 0.34 or less. When the ratio falls within such ranges, an equivalent refractive index difference caused by voltage application can be enlarged.

The lattice pattern of the holes may be appropriately set in accordance with purposes and a desired photonic band gap. In the illustrated example, the holes each having a diameter "d" form square lattices at a period P. Although the square lattices are formed in the illustrated example, when the diameters, period, and the like of the holes are appropriately set, even triangular lattices may provide the same operation, function, and effect. The square lattice patterns are formed on both the sides of the photonic crystal device, and the optical waveguide 16 is formed in the central portion thereof where no lattice pattern is formed. The length of the optical waveguide 16 is preferably 5 mm or less, more preferably from 0.1 mm to 3 mm. According to the embodiment of the present invention, the combination of the photonic crystal layer including the electro-optical crystal substrate and a predetermined diffraction grating can extremely shorten the length of the optical waveguide. As a result, the optical scanning device can be downsized. The width of the optical waveguide 16 may be, for example, from 1.01P to 3P (2P in the illustrated example) with respect to the hole period P. The number of the rows of the holes (hereinafter sometimes referred to as "lattice rows") in the optical waveguide direction may be from 3 to 10 (5 in the illustrated example) on each side of the optical waveguide. The hole period P may satisfy, for example, the following relationship:

$$(1/7) \times (\lambda/n) \leq P \leq 1.4 \times (\lambda/n)$$

where λ represents the wavelength (nm) of light to be introduced into the optical waveguide, and "n" represents the refractive index of the electro-optical crystal substrate. The hole period P may be specifically from 0.1 μm to 1 μm. In one embodiment, the hole period P may be identical to the thickness of the photonic crystal layer (electro-optical crystal substrate). The diameter "d" of each of the holes may be, for example, from 0.1P to 0.9P with respect to the hole period P. When the diameter "d" of each of the holes, the hole period P, the number of the lattice rows, the number of the holes in one lattice row, the thickness of the photonic crystal layer, the constituent material (substantially, refractive index) of the electro-optical crystal substrate, the width of the line defect portion, the width and height of the cavity to be described later, and the like are adjusted by being appropriately combined with each other, the desired photonic band gap can be obtained. Further, the same effect can be obtained for an electromagnetic wave except a light wave. Specific examples of the electromagnetic wave include a millimeter wave, a microwave, and a terahertz wave.

In one embodiment, a through-hole for etching (not shown) may be formed in the photonic crystal layer (electro-optical crystal substrate) 10. The formation of the through-hole for etching enables an etchant to satisfactorily pervade the entirety of a region to be etched. As a result, a desired cavity can be more precisely formed. The number of the through-holes for etching may be appropriately set in accordance with purposes. Specifically, a single through-hole for etching may be formed, or a plurality of (e.g., two, three, or four) through-holes for etching may be formed. The through-hole for etching is formed at, for example, a position distant from the optical waveguide by 3 or more lattice rows. Such configuration enables the etchant to satisfactorily pervade the entirety of the region to be etched without adversely affecting the photonic band gap of the photonic crystal. The through-hole for etching may also be formed on, for example, the input portion side and/or output portion side (i.e., a corner portion of the photonic crystal layer) of the end portion of the lattice pattern opposite to the optical waveguide. Such configuration can more satisfactorily prevent adverse effects on the photonic band gap. For example, when four through-holes for etching are formed, the through-holes may be formed at the four corners of the photonic crystal layer. The size of the through-hole for etching is typically larger than the size of each of the holes 12. For example, the diameter of the through-hole for etching is preferably 5 or more times, more preferably 50 or more times, still more preferably 100 or more times as large as the diameter "d" of each of the holes. Meanwhile, the diameter of the through-hole for etching is preferably 1,000 or less times as large as the diameter "d" of each of the holes. When the diameter of the through-hole for etching is excessively small, the etchant may not satisfactorily pervade the entirety of the region to be etched. When the diameter of the through-hole for etching is excessively large, the size of the device needs to be made larger than a desired size in some cases. In addition, the mechanical strength thereof may reduce.

C. Joining Portion

Typically, as illustrated in FIG. 2, the joining portion 20 integrates the second electrode 50 and the substrate 30 with each other by direct joining. When the second electrode 50 and the substrate 30 are integrated with each other through the direct joining, peeling in the optical scanning device can be satisfactorily suppressed, and as a result, damage to the electro-optical crystal substrate (e.g., a crack) resulting from such peeling can be satisfactorily suppressed.

In one embodiment, the joining portion 20 includes the protective layer 21, the cavity-processing layer 22, and the amorphous layer 23.

The protective layer 21 protects the lower surface of the second electrode 50 in production steps for the optical scanning device to be described later. The protective layer 21 is typically arranged over the entirety of the lower surface of the second electrode 50. The protective layer 21 typically has a configuration similar to that of the protective layer 43. The protective layer 21 may be absent.

The cavity-processing layer 22 is formed as an etching residual portion at the time of the formation of the cavity 80. The cavity-processing layer 22 is typically positioned between the protective layer 21 and the amorphous layer 23.

The amorphous layer 23 is a joining layer for joining the cavity-processing layer 22 and the substrate 30 to each other. The amorphous layer 23 is a layer formed at the joining interface through the direct joining of the cavity-processing layer 22 and the substrate 30. As its name suggests, the amorphous layer has an amorphous structure, and may contain an element for forming the cavity-processing layer 22 and an element for forming the substrate 30. When the cavity-processing layer 22 and the substrate 30 are directly joined to each other as described above, the amorphous layer 23 may be formed at the joining interface between the cavity-processing layer 22 and the substrate 30. That is, when the cavity-processing layer 22 and the substrate 30 are directly joined to each other, direct joining of the electro-optical crystal substrate and the substrate can be avoided, and hence the formation of the amorphous layer on the electro-optical crystal substrate can be prevented. As a result, reductions in optical characteristics of the electro-optical crystal substrate or the optical loss thereof can be suppressed.

The term "direct joining" as used herein means that two layers or substrates (in the illustrated example, the cavity-processing layer 22 and the substrate 30) are joined to each other without via any adhesive. The form of the direct joining may be appropriately set depending on the configuration of the layers or substrates to be joined to each other. For example, the direct joining may be achieved by the following procedure. In a high vacuum chamber (e.g., about $1 \times 10^{-6}$ Pa), a neutralized beam is applied to each joining surface of constituents (layers or substrates) to be joined. As a result, each joining surface is activated. Then, in a vacuum atmosphere, the activated joining surfaces are brought into contact with each other and joined to each other at normal temperature. A load at the time of the joining may be, for example, from 100 N to 20,000 N. In one embodiment, when the surface activation is performed with a neutralized beam, an inert gas is introduced into a chamber, and a high voltage is applied from a DC power source to electrodes arranged in the chamber. With such configuration, electrons are moved by an electric field generated between the electrode (positive electrode) and the chamber (negative electrode), and a beam of atoms and ions caused by the inert gas is generated. Of the beams having reached a grid, an ion beam is neutralized by the grid, and hence the beam of neutral atoms is emitted from a high-speed atom beam source. An atomic species for forming the beam is preferably an inert gas element (e.g., argon (Ar) or nitrogen (N)). A voltage at the time of activation by beam irradiation is, for example, from 0.5 kV to 2.0 kV, and an electric current is, for example, from 50 mA to 200 mA. A method for the direct joining is not limited thereto, and a surface activation method including using a fast atom beam (FAB) or an ion gun, an atomic diffusion method, a plasma joining method, or the like may also be applied.

Any appropriate configuration may be adopted for each of the protective layer 21 and the cavity-processing layer 22 in accordance with purposes, the desired configuration of the photonic crystal layer, and a method of producing the optical scanning device (substantially, an etching process). Specifically, each of the protective layer 21 and the cavity-processing layer 22 may be a single layer, or may have a laminated structure. Constituent materials for the protective layer and the cavity-processing layer (when at least one of the protective layer or the cavity-processing layer has a laminated structure, constituent materials for the respective layers) may also be appropriately selected in accordance with purposes, the desired configuration of the photonic crystal layer, and the etching process.

In one embodiment, the protective layer 21 and/or the cavity-processing layer 22 has a refractive index (dielectric constant) lower than the refractive index (dielectric constant) of the electro-optical crystal substrate 11. Thus, the joining portion 20 can function as the low-refractive index portion. The protective layer 21 and the cavity-processing layer 22 are preferably formed from the same material. A typical example of the material for the protective layer 21 and the cavity-processing layer 22 is $SiO_2$.

The refractive index of each of the protective layer 21 and the cavity-processing layer 22 is preferably 2 or less, preferably 1.8 or less, and is typically 1.4 or more.

D. Cavity

The cavity 80 is formed by removing the cavity-processing layer 22 through etching, and can function as a lower clad. The width of the cavity is preferably larger than the width of the optical waveguide. The cavity 80 preferably extends up to at least the third lattice row from the optical waveguide 16. Light propagates in the optical waveguide, and moreover, part of light energy may diffuse up to the lattice row near the optical waveguide. Accordingly, the arrangement of the cavity directly below such lattice row can suppress a propagation loss due to light leakage. From this viewpoint, the cavity 80 more preferably extends up to the fifth row from the optical waveguide 16, and further, may be formed over the entire region of a hole-formed portion.

In the illustrated example, the cavity 80 extends so as to overlap the entire region of the hole-formed portion in the thickness direction of the photonic crystal layer 10.

The height of the cavity is preferably 0.1 μm or more, more preferably 0.2 μm or more, and is typically 1.2 μm or less. In addition, the height of the cavity preferably falls within the range of from 0.2λ to 1.2λ with respect to the wavelength λ of light.

Such height causes a thin-plate slab to function as a photonic crystal, and hence can achieve an optical waveguide having higher wavelength selectivity and a lower loss. The height of the cavity may be controlled by adjusting the thickness of a sacrificial layer 81 to be described later.

E. Substrate

The substrate 30 includes an upper surface positioned in a composite substrate and a lower surface exposed to the outside. The substrate 30 is arranged for improving the strength of the composite substrate. Thus, the thickness of the electro-optical crystal substrate can be reduced. Any appropriate configuration may be adopted as the substrate 30. Specific examples of a material for forming the substrate 30 include silicon (Si), glass, SiAlON ($Si_3N_4$—$Al_2O_3$), mullite ($3Al_2O_3 \cdot 2SiO_2$, $2Al_2O_3 \cdot 3SiO_2$), aluminum nitride (AlN), silicon nitride ($Si_3N_4$), magnesium oxide (MgO), sapphire, quartz, crystal, gallium nitride (GaN), silicon carbide (SiC), and gallium oxide ($Ga_2O_3$). The coefficient of linear expansion of the material for forming the substrate 30 is preferably as close as possible to the coefficient of linear expansion of the material for forming the electro-optical crystal substrate 11. Such configuration can suppress the thermal deformation (typically, warping) of the composite substrate. The coefficient of linear expansion of the material for forming the substrate 30 preferably falls within the range of from 50% to 150% with respect to the coefficient of linear expansion of the material for forming the electro-optical crystal substrate 11. From this viewpoint, the support substrate may include the same material as that of the electro-optical crystal substrate 11.

F. Diffraction Grating

As described above, the diffraction grating 60 of the illustrated example is a grating pattern in the direction perpendicular to the direction of the waveguide in plan view, and in a section along the direction of the waveguide, the protruding portion having a width of Λ/2 and the slit having a width of Λ/2 are alternately formed. The periods of the protruding portions and the slits are each preferably from 40 nm to 1,000 nm, more preferably from 100 nm to 800 nm, still more preferably from 150 nm to 650 nm. When each of the periods of the protruding portions and the slits (accordingly, a width ½ times as large as the width of each of the protruding portion and the slit) falls within such ranges, a desired emission angle can be easily achieved. The width of each of the protruding portion and the slit may not be ½ of the period. The thickness of the protruding portion or the depth of the slit may be, for example, from 10 nm to 300 nm. When the thickness or the depth falls within such range, the following advantage is obtained: light propagating in the optical waveguide is periodically reflected by an effective refractive index difference resulting from the unevenness of the diffraction grating, and hence a diffraction effect can be expressed.

The diffraction grating (substantially, the protruding portions) may include any appropriate material as long as desired emitted light is obtained. The material for forming the diffraction grating is typically, for example, a metal oxide. Specific examples thereof include tantalum oxide, silicon oxide, aluminum oxide, titanium oxide, niobium oxide, magnesium oxide, tungsten oxide, and hafnium oxide. In addition, the diffraction grating may be directly formed on the electro-optical crystal substrate.

G. Electrodes (First Electrode and Second Electrode)

The first electrode 40 overlaps the optical waveguide 16 when viewed from the thickness direction (vertical direction) of the photonic crystal layer 10. The first electrode 40 may overlap the plurality of holes 12, or may not overlap the plurality of holes 12.

As illustrated in FIG. 1, in one embodiment, the first electrode 40 is arranged on the electro-optical crystal substrate 11 (photonic crystal layer 10) so as to overlap at least one of the plurality of holes 12 in addition to the optical waveguide 16. When the first electrode overlaps the holes, an electric field caused by voltage application can be stably applied to the periodic hole portions, and hence the effective refractive index of the optical waveguide can be efficiently changed. Accordingly, the driving power of the optical scanning device can be further reduced.

In the optical scanning device 100 of the illustrated example, the first electrode 40 overlaps all the holes 12 in the thickness direction of the photonic crystal layer 10. In one embodiment, the first electrode 40 has first openings 41 communicating to the holes 12.

In addition, as illustrated in FIG. 3, the first electrode 40 may be arranged only directly above the optical waveguide 16 so as not to overlap the holes 12.

As described above, the first electrode 40 is transparent to light. More specifically, the transmittance of light having a wavelength of 1.025 μm in the first electrode 40 is, for example, 80% or more, preferably 90% or more, and is, for example, 100% or less. That is, the first electrode 40 may be a transparent electrode.

When the first electrode is transparent to light, light emitted from the upper surface of the optical waveguide can be suppressed from being absorbed by the first electrode.

The first electrode 40 (transparent electrode) may be formed of any appropriate material.

Examples of the material for forming the first electrode 40 include aluminum-doped zinc oxide (AZO), gallium-doped zinc oxide (GZO), silicon oxide, indium tin oxide (ITO), an In—Ga—Zn—O oxide semiconductor (IGZO), and tin oxide.

The first electrode 40 may be a single layer or a laminate of two or more layers. The thickness of the first electrode 40 is typically 50 nm or more and 300 nm or less.

The second electrode 50 overlaps the optical waveguide 16 when viewed from the thickness direction (vertical direction) of the photonic crystal layer 10. The second electrode 50 typically overlaps the plurality of holes 12. In the embodiment of the illustrated example, the second electrode 50 overlaps all the holes 12 in the thickness direction of the photonic crystal layer 10. In one embodiment, the second electrode 50 has second openings 51 communicating to the holes 12.

In the illustrated examples of FIG. 1 and FIG. 3, as in the first electrode 40, the second electrode 50 is transparent to light. The range of the transmittance of light having a wavelength of 1.025 μm in the second electrode 50 is, for example, the same as the above-mentioned range of the transmittance of light having a wavelength of 1.025 μm in the first electrode 40. That is, the second electrode 50 may be a transparent electrode.

In this case, any appropriate material may be adopted as a material for forming the second electrode 50 (transparent electrode), and typical examples thereof include the above-mentioned materials for forming the first electrode 40.

The second electrode 50 (transparent electrode) may be a single layer or a laminate of two or more layers. The thickness of the second electrode 50 is typically 50 nm or more and 300 nm or less.

H. Method of Producing Optical Scanning Device

An example of a method of producing the optical scanning device is simply described with reference to FIG. 10A to FIG. 13C.

Figure 10A:
FIG. 10A to FIG. 10C are schematic sectional views for illustrating an example of a method of producing the optical scanning device according to the embodiment of the present invention, FIG. 10A being an illustration of a step of forming a second electrode, FIG. 10B being an illustration of a step of forming a protective layer, and FIG. 10C being an illustration of a step of forming a sacrificial layer.
Figure 10B:
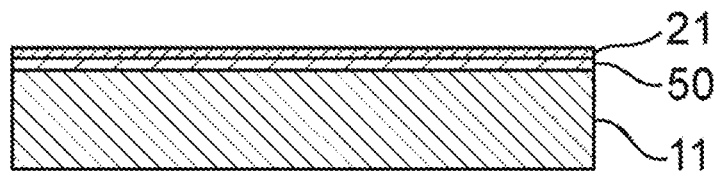
Figure 10C:
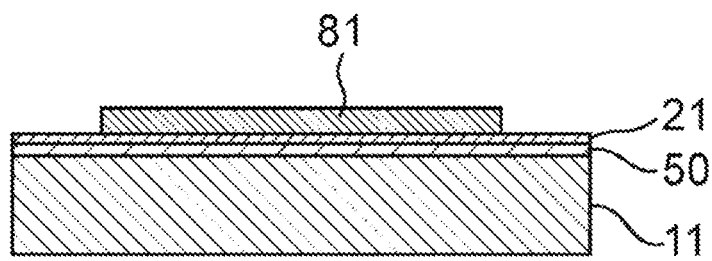

First, as illustrated in FIG. 10A, the electro-optical crystal substrate 11 is prepared, and the second electrode 50 is formed on the electro-optical crystal substrate 11 by, for example, sputtering. Next, as illustrated in FIG. 10B, the protective layer 21 is formed on the second electrode 50 by, for example, sputtering. Next, as illustrated in FIG. 10C, a patterned sacrificial layer 81 is formed on the protective layer 21. Specifically, the sacrificial layer 81 is formed on the entire surface of the protective layer 21 by, for example, sputtering, and a resist mask pattern covering a predetermined portion is then formed by, for example, photolithography, followed by the formation of the patterned sacrificial layer 81 by reactive ion etching or wet etching (e.g., immersion in an etchant) through the mask pattern.

Figure 11A:
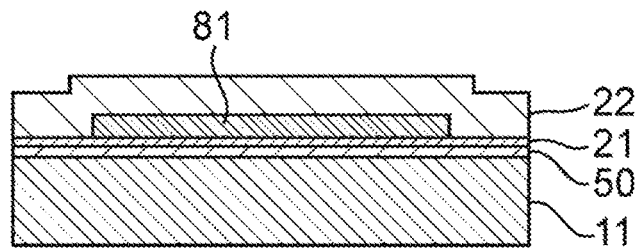
FIG. 11A to FIG. 11C are schematic sectional views for illustrating production steps for the optical scanning device continuing from FIG. 10C, FIG. 11A being an illustration of a step of forming a cavity-processing layer, FIG. 11B being an illustration of a step of polishing the surface of the cavity-processing layer, and FIG. 11C being an illustration of a step of forming an amorphous layer.
Figure 11B:
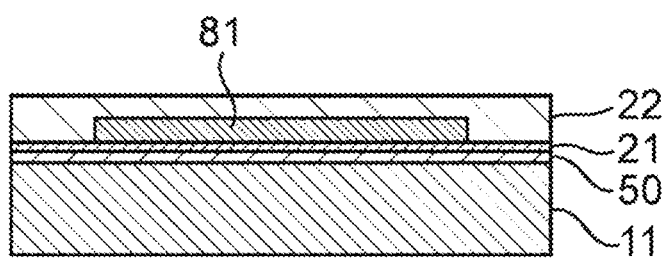
Figure 11C:
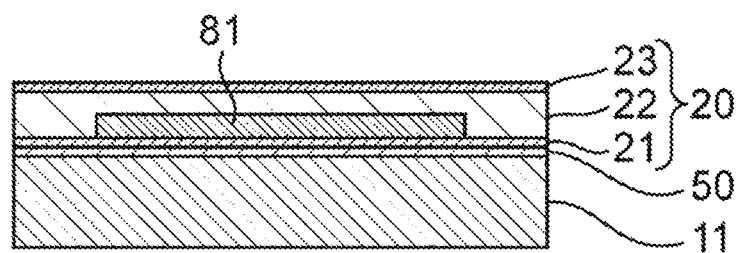

Next, as illustrated in FIG. 11A, the cavity-processing layer 22 is formed on the protective layer 21 by, for example, sputtering so as to cover the sacrificial layer 81. After that, as illustrated in FIG. 11B, as required, the cavity-processing layer 22 is adjusted to a predetermined thickness by polishing, and then the surface of the cavity-processing layer 22 is washed. Next, as illustrated in FIG. 11C, the amorphous layer 23 is formed on the cavity-processing layer 22 by, for example, sputtering. After that, as required, the surface of the amorphous layer 23 is polished.

Figure 12A:
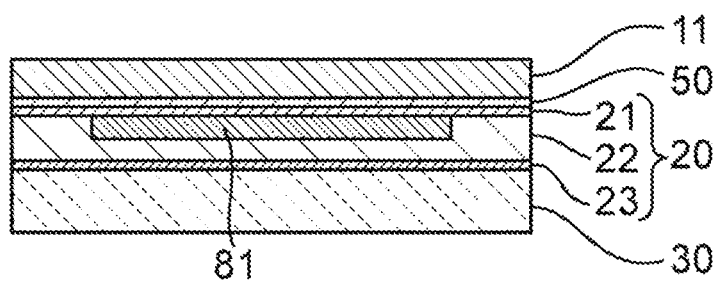
FIG. 12A to FIG. 12D are schematic sectional views for illustrating production steps for the optical scanning device continuing from FIG. 11C, FIG. 12A being an illustration of a step of forming a composite substrate, FIG. 12B being an illustration of a step of forming a diffraction grating, FIG. 12C being an illustration of a step of forming a first electrode, and FIG. 12D being an illustration of a step of forming a protective layer.
Figure 12B:
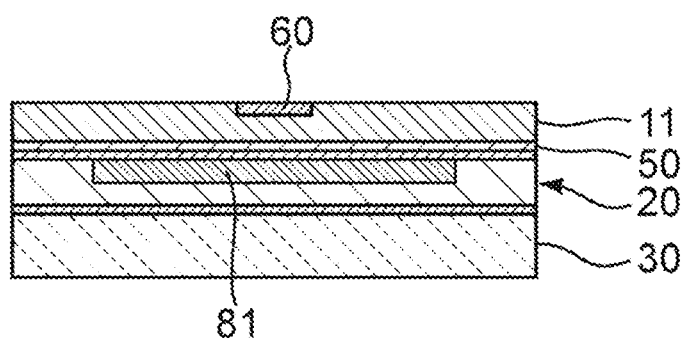

Next, as illustrated in FIG. 12A, the laminate of the electro-optical crystal substrate 11, the second electrode 50, and the joining portion 20 is directly joined to the substrate 30 by using the amorphous layer 23 and the substrate 30 as joining surfaces. Thus, the composite substrate in which the electro-optical crystal substrate 11, the second electrode 50, and the substrate 30 are integrated with each other may be obtained. Next, as illustrated in FIG. 12B, the diffraction grating 60 is formed at the position at which the optical waveguide 16 is to be formed.

Specifically, a metal mask is formed on the entire surface of the electro-optical crystal substrate 11 by, for example, sputtering, and then a resin pattern of a stripe shape extending in a direction substantially perpendicular to the waveguide direction of the waveguide is formed. Subsequently, the metal mask is formed into a stripe shape by, for example, dry etching (e.g., reactive ion etching) through the resin pattern, and then the diffraction grating 60 is formed by, for example, dry etching (e.g., reactive ion etching) through the metal mask of a stripe shape. After that, the metal mask is removed as required.

Figure 12C:
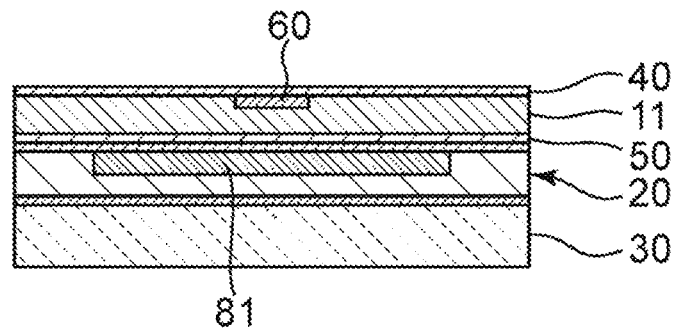
Figure 12D:
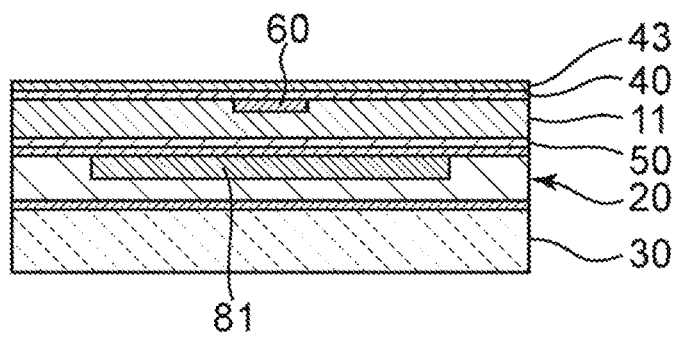

Next, as illustrated in FIG. 12C, the first electrode 40 is formed on the electro-optical crystal substrate 11 by, for example, sputtering. After that, as required, as illustrated in FIG. 12D, the protective layer 43 is formed on the first electrode 40 by, for example, sputtering.

Figure 13A:
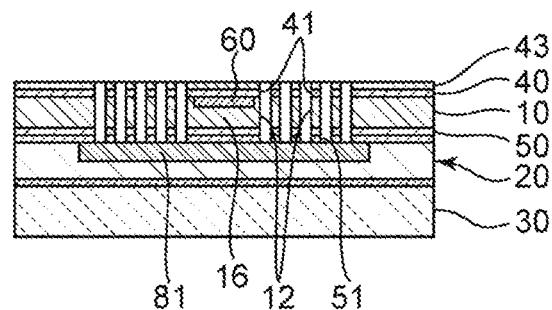
FIG. 13A to FIG. 13C are schematic sectional views for illustrating production steps for the optical scanning device continuing from FIG. 12D, FIG. 13A being an illustration of a step of forming a plurality of holes, FIG. 13B being an illustration of a step of forming a cavity, and FIG. 13C being an illustration of a step of forming a metal pad.

Next, as illustrated in FIG. 13A, the plurality of holes 12 are formed in the electro-optical crystal substrate 11 to provide the photonic crystal layer 10. Specifically, a metal mask is formed on the entire surface of the protective layer 43 by, for example, sputtering, and then a resin pattern having holes in a predetermined arrangement is formed on the metal mask. Subsequently, holes corresponding to the resin pattern are formed in the metal mask by, for example, dry etching (e.g., reactive ion etching) through the resin pattern. After that, holes are formed in the protective layer 43, the first electrode 40, the electro-optical crystal substrate 11, the second electrode 50, and the protective layer 21 by dry etching (e.g., reactive ion etching) through the metal pattern having a plurality of holes.

Figure 13B:
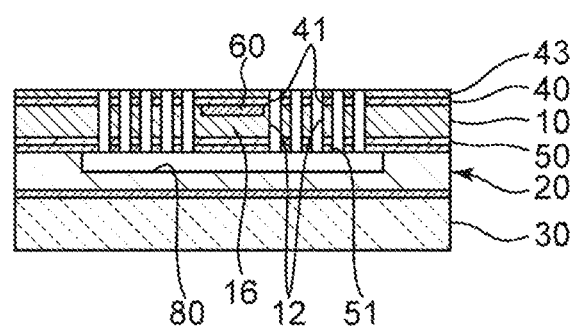

Next, as illustrated in FIG. 13B, the sacrificial layer 81 is removed by reactive ion etching or wet etching (e.g., immersion in an etchant) to form the cavity 80. After that, the metal mask is removed by wet etching (e.g., immersion in an etchant).

Figure 13C:
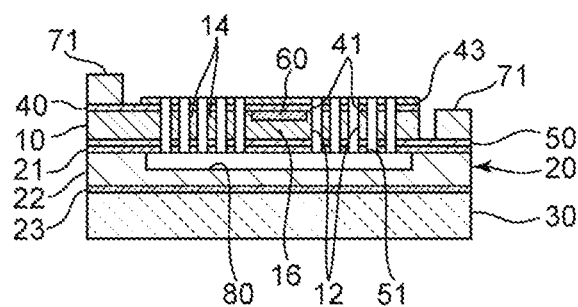

After that, as required, as illustrated in FIG. 13C, part of the first electrode 40 and part of the second electrode 50 are exposed by dry etching (e.g., reactive ion etching) through a predetermined mask. Then, the metal pad 71 may be formed on the exposed portion of each of the electrodes by, for example, a lift-off.

Thus, the optical scanning device may be obtained.

Needless to say, a process different from that of the illustrated example may be adopted for the production of the optical scanning device.

When the overall configuration of the composite substrate, the constituent materials of the respective layers of the composite substrate, the mask, an etching mode, and the like are appropriately combined with each other, the diffraction grating, the holes, and the cavity can be formed by an efficient procedure and with high accuracy, and hence the optical scanning device can be produced.

I. Optical Modulation Device

The waveguide device of the present invention is not limited to the above-mentioned optical scanning device. FIG. 6 is a schematic perspective view of an optical modulation device according to still another embodiment of the present invention. In an optical modulation device 103 of the illustrated example, the optical waveguide 16 is a Mach- Zehnder optical waveguide 17 including a first straight waveguide 171 and a second straight waveguide 172. The first straight waveguide 171 and the second straight waveguide 172 are approximately parallel to each other. The first electrode 40 is arranged so as to overlap the first straight waveguide 171 in the thickness direction of the photonic crystal layer 10. In addition, the optical modulation device 103 further includes a third electrode 42 arranged above the electro-optical crystal substrate 11, the third electrode being transparent to light. The third electrode 42 is arranged so as to overlap the second straight waveguide 172 in the thickness direction of the photonic crystal layer 10. The third electrode 42 is electrically connected to a power source 72.

When the first electrode 40 overlapping the first straight waveguide 171 and the third electrode 42 overlapping the second straight waveguide 172 are transparent to light, light propagating in the Mach-Zehnder optical waveguide 17 can be suppressed from being absorbed by the first electrode 40 and the third electrode 42, and hence a reduction in propagation loss can be achieved.

EXAMPLES

Now, the present invention is specifically described by way of Examples. However, the present invention is not limited to these Examples.

Reference Example 1: Analysis of Relationship Between Equivalent Refractive Index and Emission Angle 1. Wavelength Dependence and Electric Field Dependence of Equivalent Refractive Index A photonic crystal layer equivalent to that of FIG. 1 was examined for the wavelength dependence and electric field dependence of the equivalent refractive index of light propagating in its optical waveguide. Herein, a lithium niobate crystal substrate was used as an electro-optical crystal substrate, and the thickness of the substrate was set to 0.4 µm. The electro-optical crystal substrate was a Z-cut substrate, and the c-axis of the electro-optical crystal substrate was perpendicular to the electro-optical crystal substrate. Further, the hole pattern of the layer was set to a triangular lattice pattern, and the hole period and hole diameter thereof were set to 425 nm and 289 nm, respectively. Through use of such conditions, a relationship between an equivalent refractive index difference and the wavelength of the light was calculated by a finite difference time domain (FDTD) method and by using the electric field intensity of the optical waveguide when a voltage was applied to the optical waveguide as a parameter. The results are shown in FIG. 14. As is apparent from FIG. 14, it is found that in the short-wavelength region of a photonic band, the wavelength dependence of the equivalent refractive index difference changes to such a small extent as to follow the typical wavelength dispersion of a refractive index. In addition, with regard to the electric field dependence of the equivalent refractive index difference, the numerical value thereof is increased by an amount roughly corresponding to an electro-optical effect (Pockels effect). Meanwhile, in the long-wavelength region of the photonic band, each of the wavelength dependence and the electric field dependence changes by a large amount. The equivalent refractive index difference $\Delta N_{eff}$ in FIG. 14 is represented by the following equation where $N_{eff}(0)$ represents an equivalent refractive index when no voltage is applied, and $N_{eff}(V)$ represents an equivalent refractive index when a voltage is applied.

$$\Delta N_{eff} = N_{eff}(V) - N_{eff}(0)$$

The relationship of the equivalent refractive index difference with an applied electric field, which is obtained from the results of the above-mentioned section 1., is shown in FIG. 15. The wavelength was set to 0.96 µm, 1 µm, 1.025 µm, or 1.026 µm, and the electric field was set to 0.1 V/µm, 10 V/µm, 20 V/µm, or 50 V/µm. It is found from FIG. 15 that the equivalent refractive index difference linearly changes with the voltage (electric field). In addition, it was found that a voltage (electric field)-dependent equivalent refractive index difference became larger as the wavelength became closer to longer wavelengths of a photonic band end. It is found that in the case of a wavelength of 1.025 µm, the equivalent refractive index changes by 0.38 in an electric field of 20 V/µm. The upper limit of the applied voltage (electric field) may vary depending on a constituent material for the electro-optical crystal substrate. In the case of, for example, a lithium niobate crystal, its dielectric breakdown electric field is said to be 20 V/µm, and hence an optical scanning device including the crystal needs to be operated in an electric field equal to or less than the value. With regard to the phenomenon, the same change occurs even in an electric field of the opposite direction. Accordingly, the application of an electric field of ±20 V/µm changes the equivalent refractive index by up to 0.76.

2. Relationship Between Applied Voltage and Emission Angle

A relationship between an applied voltage and an emission angle (deflection angle) in the optical scanning device of FIG. 1 was calculated by using the equation (3). A specific procedure is as described below. When the propagation constant of light propagating in the optical waveguide of the device is represented by $\beta$, the left-hand side of the equation (3) can be represented by the equation (4). A diffraction order "q" in the equation (4) is set to −1.

$$\beta - 2\pi/\Lambda = \beta N \qquad (4)$$

Meanwhile, when the refractive index $n_a$ of the upper clad of the optical waveguide is set to 1 on the assumption that air serves as the clad, the right-hand side thereof can be represented by the equation (5).

$$2\pi/\lambda \cdot \sin\theta_a = k_0 \cdot \sin\theta_a \qquad (5)$$

When the hole period "d" is set to 425 nm, and the wavelength λ of the light is set to 1.025 µm, under a state in which no voltage is applied to the device, the propagation constant $\beta$ is calculated to be 0.75×(2π/d) by FDTD calculation. Herein, a relationship between the hole period "d" and the wavelength λ is represented as d/λ=0.414, and hence a relationship represented by the equation (6) is obtained.

$$\beta = 1.81 k_0 \qquad (6)$$

Figure 16:
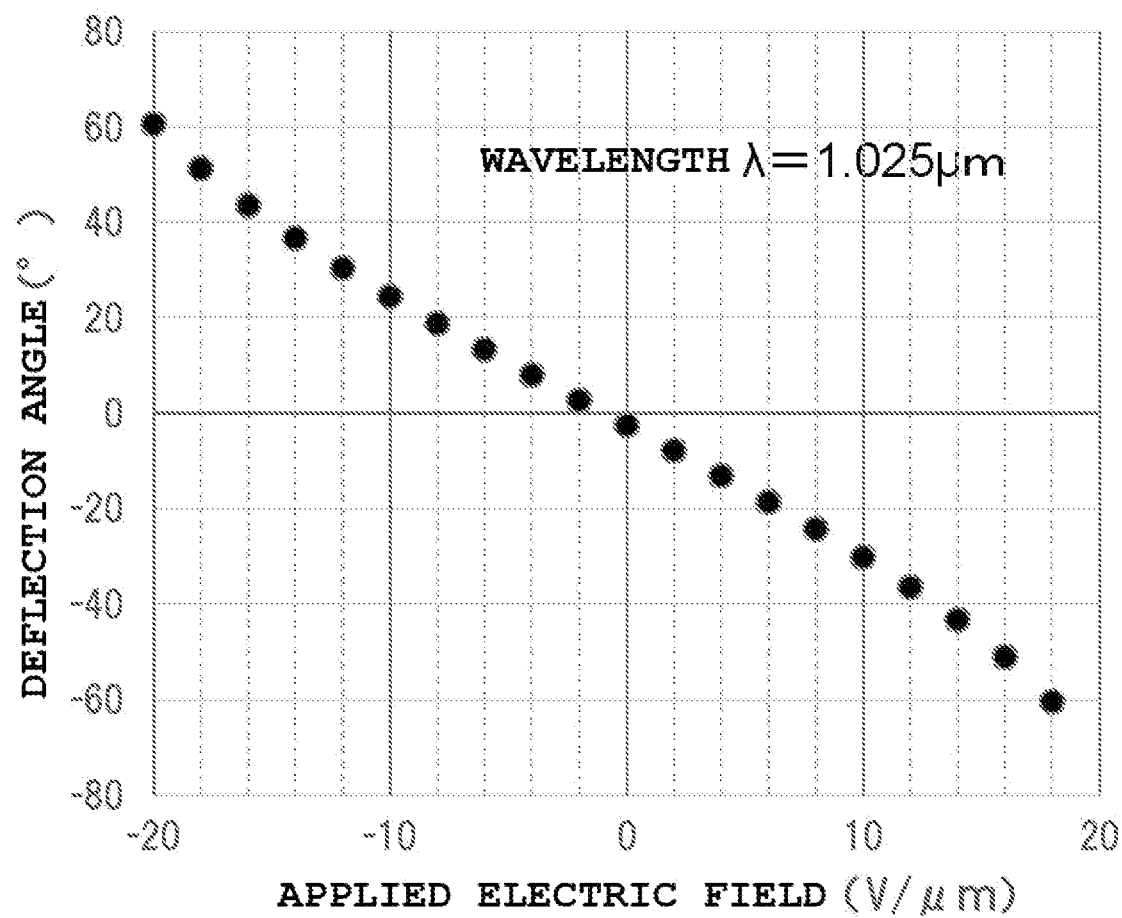
FIG. 16 is a graph for showing a relationship between the applied voltage and an emission angle.

In the case where a diffraction grating period $\Lambda$ is 567 nm, when the result obtained in the equation (6) is substituted into the equation (4), 2π/Λ is equal to $1.81 k_0$, and hence the equation (4) is rewritten as $\beta N=0$. As a result, the equations (4) and (5) provide $\theta_a=0°$. Next, when a voltage is applied thereto, and the intensity of an electric field generated by the voltage is set to −20 V/µm, the equivalent refractive index of the optical waveguide changes by −0.38, and hence the propagation constant $\beta$ is calculated to be 0.39×(2π/d) by the FDTD calculation. Accordingly, $\beta=0.94 k_0$ is obtained. The same calculation as that described above provides $\beta N = -0.87k_0$, and hence the equations (4) and (5) provide $\theta_a = 60°$. Further, when a voltage is applied thereto, and the intensity of an electric field generated by the voltage is set to 20 V/μm, the equivalent refractive index changes by +0.38, and hence the propagation constant $\beta$ is calculated to be 1.11× (2π/d) by the FDTD calculation. Accordingly, $\beta = 2.67k_0$ is obtained. The same calculation as that described above provides $\beta N = 0.87k_0$, and hence the equations (4) and (5) provide $\theta_a = -60°$. The foregoing results are shown in FIG. 16. It is found from FIG. 16 that when the applied voltage is changed from −20 V/μm to 20 V/μm, the emission angle can be changed from about −60° to about +60°, that is, by about 120°. In consideration of the foregoing together with the results of FIG. 15, at longer wavelengths of a photonic band, the electric field dependence of the equivalent refractive index becomes larger, and hence the amount of a change in equivalent refractive index with a change in electric field can be increased. Accordingly, the emission angle can be changed in a wide range.

Example 1: Production of Optical Scanning Device: Upper Electrode (Entire Surface)

The optical scanning device illustrated in FIG. 1 was produced.

1. Formation of Lower Electrode (Second Electrode, Transparent Electrode)

A Z-cut lithium niobate substrate having a diameter of 4 inches (refractive index: 2.2) was prepared as an electro-optical crystal substrate. First, aluminum-doped zinc oxide (AZO, refractive index: 1.5) was sputtered onto the electro-optical crystal substrate to form an AZO film (thickness: 100 nm) serving as a transparent electrode (second electrode) (see FIG. 10A).

2. Formation of Joining Portion (Protective Layer, Sacrificial Layer, and Cavity-Processing Layer)

Next, silicon oxide was sputtered onto the second electrode (AZO film) to form a SiO$_2$ film (thickness: 50 nm) serving as a protective layer (see FIG. 10B).

Next, a patterned sacrificial layer was formed on the protective layer (see FIG. 10C). Specifically, amorphous Si was sputtered onto the entire surface of the SiO$_2$ film (protective layer) to form an amorphous Si film (thickness: 300 nm). Subsequently, a resist was applied onto the amorphous Si film, and a resist mask pattern covering the portion (width: 20 μm, length: 1 mm) of the amorphous Si film that was to become a sacrificial layer portion was formed by photolithography. After that, the amorphous Si film was removed, except for the portion covered with the resist mask, by fluorine-based reactive ion etching to form a sacrificial layer.

Next, a cavity-processing layer was formed on the protective layer so as to cover the sacrificial layer (see FIG. 11A). Specifically, silicon oxide was sputtered onto the SiO$_2$ film (protective layer) so as to cover the sacrificial layer to form a SiO$_2$ film (thickness: 1.5 μm) serving as a cavity-processing layer. A step due to the sacrificial layer was formed on the surface of the cavity-processing layer. After that, the surface of the cavity-processing layer was subjected to CMP polishing so that its thickness was set to 1.0 μm, and at the same time, the arithmetic average roughness Ra of the surface was set to 0.2 nm or less (see FIG. 11B).

Next, an amorphous layer serving as a joining layer was formed on the cavity-processing layer (see FIG. 11C). Specifically, the surface of the SiO$_2$ film (cavity-processing layer) was washed, and then high-resistivity amorphous Si (HR-a-Si) was sputtered onto the SiO$_2$ film (cavity-processing layer) to form an amorphous layer (thickness: 100 nm). Further, the surface of the amorphous layer was subjected to CMP polishing so that the arithmetic average roughness Ra of the surface of the amorphous layer was set to 0.2 nm or less.

3. Formation of Composite Wafer (Direct Joining)

A silicon substrate having a diameter of 4 inches was prepared as a substrate. The surface of the amorphous layer (joining layer) was washed, and then the joining layer and the substrate were directly joined to each other as described below to integrate the electro-optical crystal substrate, the second electrode, and the substrate with each other (see FIG. 12A). First, in a vacuum of the order of 10$^{-6}$ Pa, each of the joining surface of the joining portion (the surface of the amorphous layer) and the joining surface (surface) of the substrate was irradiated with a high-speed Ar neutral atom beam (acceleration voltage: 1 kV, Ar flow rate: 60 sccm) for 70 seconds. After the irradiation, the electro-optical crystal substrate and the substrate were left standing to cool by being left for 10 minutes, and then the surface of the amorphous layer was brought into contact with the substrate, followed by pressurization at 4.90 kN for 2 minutes. Thus, the joining portion and the substrate were joined to each other.

Then, polishing was performed until the thickness of the electro-optical crystal substrate became 0.4 μm. Thus, a composite substrate was obtained. In the resultant composite substrate, a failure such as peeling was not observed at a joining interface.

4. Formation of Diffraction Grating

A diffraction grating was formed on the surface of the electro-optical crystal substrate of the composite substrate obtained in the above-mentioned section 3. (see FIG. 12B). A specific procedure was as described below. First, aluminum (Al) was formed into a film serving as a metal mask on the surface of the electro-optical crystal substrate, and a resin pattern was formed on the metal mask by an EB lithography method. The resin pattern was formed above the portion of the electro-optical crystal substrate serving as an optical waveguide so as to have a stripe shape, which extended in a direction perpendicular to the waveguide direction of the optical waveguide and had a period of 567 nm (line/space: 283.5 nm/283.5 nm), and to have a length of 1,000 μm in the waveguide direction of the optical waveguide. Next, a metal mask of a diffraction grating pattern shape was formed by chlorine-based reactive ion etching through use of the resin pattern as a mask. Next, the electro-optical crystal substrate was etched by fluorine-based reactive ion etching through the metal mask of a diffraction grating pattern shape to form diffraction grating grooves each having a depth of 0.05 μm. Finally, the metal mask was removed with an Al etchant. Thus, the diffraction grating was formed on the portion of the electro-optical crystal substrate serving as the optical waveguide.

5. Formation of Upper Electrode (First Electrode, Transparent Electrode)

A transparent electrode (first electrode) was formed on the surface of the electro-optical crystal substrate of the composite substrate obtained in the above-mentioned section 4., which had formed therein the diffraction grating (see FIG. 12C). Specifically, aluminum-doped zinc oxide (AZO) was sputtered onto the entire surface of the electro-optical crystal substrate so as to cover the diffraction grating. Thus, an AZO film (thickness: 100 nm) serving as a transparent electrode (first electrode) was formed. After that, silicon oxide was sputtered onto the first electrode (AZO film) to form a $SiO_2$ film (thickness: 50 nm) serving as a protective layer (see FIG. 12D). A gap between the formed first electrode and second electrode was 0.4 µm.

6. Production of Optical Scanning Device

An optical scanning device was produced from the composite substrate obtained in the above-mentioned section 5., which had formed thereon the diffraction grating and the electrodes, by the following procedure (see FIG. 13A to FIG. 13C). Specifically, first, chromium (Cr) was formed into a film serving as a metal mask on the protective layer ($SiO_2$ film). Next, a resin pattern having holes in a predetermined arrangement was formed on the metal mask by an EB lithography method. Specifically, 10 lattice rows having holes each having a diameter of 289 nm at a period (pitch) of 425 nm in each of an optical waveguide direction and a direction perpendicular to the optical waveguide direction were formed as a hole pattern corresponding to the holes of a photonic crystal on each of the left side and right side of the diffraction grating. No hole was formed in the central portion thereof (the portion finally serves as an optical waveguide). Further, four holes each having a diameter of 10 µm (a pattern of through-holes for etching) were formed in corner portions (the input portion sides and output portion sides of the end portions of the left and right lattice row portions opposite to the portion serving as the optical waveguide). Next, holes corresponding to the patterns were formed in the Cr mask by fluorine-based reactive ion etching. Next, the hole patterns and the through-holes for etching were formed in the first electrode, the electro-optical crystal substrate, the second electrode, and the protective layer by fluorine-based reactive ion etching through the pattern-formed Cr mask.

Next, the composite substrate was exposed in a $XeF_2$ gas atmosphere so that the amorphous Si serving as the sacrificial layer was removed. Thus, a cavity was formed. Further, the residue of the Cr mask was removed with a Cr etchant (mixed liquid containing diammonium cerium nitrate, perchloric acid, and water at a mixing ratio of 15:5:80). After that, masking with a film resist was performed, and part of each of the first electrode and the photonic crystal layer was removed by fluorine-based reactive ion etching to expose part of the AZO film serving as the second electrode (see FIG. 13C). After that, similarly, part of the protective layer was removed to expose the AZO film serving as the first electrode (see FIG. 13C). Through those operations, such a structure that a voltage was able be applied to the optical scanning device was obtained.

Thus, an optical scanning device wafer was obtained. The resultant optical scanning device wafer was cut into chips by dicing to provide the optical scanning devices. The optical waveguide length of each of the optical scanning devices was set to 1 mm. After the chip cutting, the input-side end surface and output-side end surface of the optical waveguide were subjected to end surface polishing.

The optical insertion loss of each of the resultant optical scanning devices (chips) was measured. Specifically, laser light having a wavelength of 1.025 µm was introduced into the chip (substantially, the optical waveguide of the photonic crystal layer) through an input-side hemispherical-ended fiber coupled with an optical fiber, and the quantity of the light output through an output-side hemispherical-ended fiber was measured with a photodetector, followed by the calculation of a propagation loss. The propagation loss of the optical waveguide was 0.5 dB/cm.

Further, a voltage (driving voltage) to be applied between the electrodes of the optical scanning device was switched between ±8 V, and the pattern and emission angle of the laser light output from the optical waveguide were observed. With regard to the pattern and emission angle of the laser light, the angle of a fan and the applied voltage dependence characteristic of the emission angle were measured with a high-speed goniophotometric measurement system (RH50) manufactured by Otsuka Electronics Co., Ltd. As a result, the output laser light was a so-called fan beam shape that was a line shape in plan view and was a fan shape when viewed from the optical waveguide direction, and the angle of the fan (the spread angle of the fan) was 30°. In addition, it was recognized that when the applied voltage was changed, the emission angle was able to be changed from −60° to +60° with respect to the normal direction of the optical scanning device.

In addition, to experimentally verify the responsiveness of the optical scanning device, whether or not the device was able to scan light at a voltage of ±3 V and 50 MHz was observed. As a result, it was able to be recognized that the device was able to scan without any problem. It can be assumed that the optical scanning device according to the embodiment of the present invention can operate at a frequency of the order of gigahertz because the device depends on the responsiveness of an e electro-optical effect in principle. The operation of the optical scanning device may be affected by its electrode structure.

Example 2: Production of Optical Scanning Device: Upper Electrode (Only on Line-defect Waveguide Portion)

The optical scanning device illustrated in FIG. 3 was produced by the same process as that of Example 1 except the following points.

In the section 5. "Formation of Upper Electrode (First Electrode, Transparent Electrode)," aluminum-doped zinc oxide (AZO) was sputtered onto the electro-optical crystal substrate so as to cover the diffraction grating. Thus, an AZO film (thickness: 100 nm) serving as a transparent electrode (first electrode) was formed. After that, silicon oxide was sputtered onto the first electrode (AZO film) to form a $SiO_2$ film (thickness: 50 nm) serving as a protective layer. To form the first electrode only on the line-defect optical waveguide, a resist was applied onto the protective layer, and a resist mask pattern for masking a portion (width: 1 µm, length: 1 mm) that was to become the first electrode was formed by photolithography. After that, the protective layer ($SiO_2$ film) and the AZO film exposed from the resist mask were etched by fluorine-based reactive ion etching to form the first electrode. Finally, the resist mask was removed with acetone. A gap between the formed first electrode and second electrode was 0.4 µm.

An optical scanning device was produced from the composite substrate obtained in the foregoing, which had formed thereon the diffraction grating and the electrodes. Specifically, the optical scanning device was produced by the same method as that of Example 1.

The optical insertion loss of the resultant optical scanning device (chip) was measured. Specifically, laser light having a wavelength of 1.025 μm was introduced into the chip (substantially, the optical waveguide of the photonic crystal layer) through an input-side hemispherical-ended fiber coupled with an optical fiber, and the quantity of the light output through an output-side hemispherical-ended fiber was measured with a photodetector, followed by the calculation of a propagation loss. The propagation loss of the optical waveguide was 0.5 dB/cm.

Further, a voltage (driving voltage) to be applied between the electrodes of the optical scanning device was switched between ±8 V, and the pattern and emission angle of the laser light output from the optical waveguide were observed. With regard to the pattern and emission angle of the laser light, the angle of a fan and the applied voltage dependence characteristic of the emission angle were measured with a high-speed goniophotometric measurement system (RH50) manufactured by Otsuka Electronics Co., Ltd. As a result, the output laser light was a so-called fan beam shape that was a line shape in plan view and was a fan shape when viewed from the optical waveguide direction, and the angle of the fan (the spread angle of the fan) was 30°. In addition, it was recognized that when the applied voltage was changed, the emission angle was able to be changed from −40° to +40° with respect to the normal direction of the optical scanning device.

In addition, to experimentally verify the responsiveness of the optical scanning device, whether or not the device was able to scan light at a voltage of ±3 V and 50 MHz was observed. As a result, it was able to be recognized that the device was able to scan without any problem.

The driving voltage was ±8 V in both of Examples 1 and 2, but the variable range of the emission angle of Example 2 (from −40° to +40°) was smaller than the variable range of the emission angle of Example 1 (from −60° to +60°). It is understood that in the configuration of Example 2, a higher driving voltage is required for the variable range of the emission angle to be broadened to be comparable to that of Example 1 (from −60° to +60°).

The reason why the driving voltage required for securing the variable range of the emission angle was increased as compared to Example 1 is conceived to be as follows: an electric field caused by voltage application was not applied to the periodic hole portions, and hence the change in effective refractive index for propagation in the waveguide was reduced, with the result that a higher voltage was required.

Example 3: Production of Optical Modulation Device

The optical modulation device illustrated in FIG. 6 was produced by the same process as that of Example 2 except the following points.

In the case of the optical modulation device, the line-defect waveguide had a Mach-Zehnder interference pattern, and included a first straight waveguide and a second straight waveguide. The length of each of the first straight waveguide and the second straight waveguide was set to 5 mm. The first electrode was arranged so as to overlap the first straight waveguide in the thickness direction of the photonic crystal layer. Further, a third electrode was formed in the same manner as the first electrode. The third electrode was arranged so as to overlap the second straight waveguide in the thickness direction of the photonic crystal layer. In addition, the thickness of the $SiO_2$ film serving as the cavity-processing layer was changed to 2 μm. In addition, no diffraction grating was formed in the electro-optical crystal substrate.

The optical insertion loss of the resultant optical modulation device (chip) was measured. Specifically, laser light having a wavelength of 1.025 μm was introduced into the chip (substantially, the optical waveguide of the photonic crystal layer) through an input-side hemispherical-ended fiber coupled with an optical fiber, and the quantity of the light output through an output-side hemispherical-ended fiber was measured with a photodetector, followed by the calculation of a propagation loss. The propagation loss of the optical waveguide was 0.5 dB/cm.

To evaluate the optical modulation characteristic of the optical modulation device, a differential signal having a frequency of 10 GHz and a voltage of 5 V was input into each of the first electrode and the third electrode (upper transparent electrode), and output light was observed. As a result, an eye opening pattern having an extinction ratio of 15 dB or more was able to be observed.

Comparative Example 1: Production of Optical Scanning Device: X-Plate LN Structure A composite substrate having formed therein a diffraction grating was produced by the same method as that of Example 1 except that an X-cut lithium niobate substrate having a diameter of 4 inches was used as the electro-optical crystal substrate.

Next, a pair of transparent electrodes arranged above the electro-optical crystal substrate and arranged at an interval from each other in a direction perpendicular to the waveguide direction was formed on the surface of the electro-optical crystal substrate of the composite substrate having formed therein the diffraction grating. Specifically, aluminum-doped zinc oxide (AZO) was sputtered onto the entire surface of the electro-optical crystal substrate so as to cover the diffraction grating. Thus, an AZO film (thickness: 100 nm) was formed. After that, silicon oxide was sputtered onto the AZO film to form a $SiO_2$ film (thickness: 50 nm) serving as a protective layer. A resist was applied onto the protective layer, and a resist mask pattern for masking portions that were to become a pair of transparent electrodes was formed by photolithography. After that, the protective layer ($SiO_2$ film) and the AZO film exposed from the resist mask were etched by fluorine-based reactive ion etching to form a pair of transparent electrodes above the electro-optical crystal substrate. Finally, the resist mask was removed with acetone. A gap between the formed pair of transparent electrodes was 1.0 μm.

An optical scanning device was produced from the composite substrate obtained in the foregoing, which had formed therein and thereon the diffraction grating and the electrodes. Specifically, the production was performed by the same method as that of Example 1.

The optical insertion loss of each of the resultant optical scanning devices (chips) was measured. Specifically, laser light having a wavelength of 1.025 μm was introduced into the chip (substantially, the optical waveguide of the photonic crystal layer) through an input-side hemispherical-ended fiber coupled with an optical fiber, and the quantity of the light output through an output-side hemispherical-ended fiber was measured with a photodetector, followed by the calculation of a propagation loss. The propagation loss of the optical waveguide was 0.5 dB/cm.

Further, a voltage (driving voltage) to be applied between the electrodes of the optical scanning device was switched between ±25 V, and the pattern and emission angle of the laser light output from the optical waveguide were observed. With regard to the pattern and emission angle of the laser light, the angle of a fan and the applied voltage dependence characteristic of the emission angle were measured with a high-speed goniophotometric measurement system (RH50) manufactured by Otsuka Electronics Co., Ltd. As a result, the output laser light was a so-called fan beam shape that was a line shape in plan view and was a fan shape when viewed from the optical waveguide direction, and the angle of the fan (the spread angle of the fan) was 30°. In addition, it was recognized that when the applied voltage was changed, the emission angle was able to be changed from −60° to +60° with respect to the normal direction of the optical scanning device.

In addition, to experimentally verify the responsiveness of the optical scanning device, whether or not the device was able to scan light at a voltage of ±4 V and 50 MHz was observed. As a result, it was able to be recognized that the device was able to scan without any problem.

In Comparative Example 1, a driving voltage of ±25 V was required for allowing the fan beam having an angle of the fan (spread angle of the fan) of 30° to be able to be changed in the range of the emission angle of from −60° to +60°. In contrast, in Example 1, the driving voltage required for the output of the same fan beam as that of Comparative Example 1 was ±8 V, and hence it was recognized that the driving voltage was remarkably reduced. This is conceivably because in the mode in which the first electrode and the second electrode are arranged above and below the electro-optical crystal substrate (Example 1), as compared to the mode in which the pair of transparent electrodes is arranged above the electro-optical crystal substrate (Comparative Example 1), the interval between the first electrode and the second electrode can be reduced, and hence an electric field can be efficiently generated in the optical waveguide positioned between the first electrode and the second electrode.

Comparative Example 2: Production of Optical Scanning Device: Silicone Substrate Optical scanning devices (chips) were produced in the same manner as in Comparative Example 1 except that: a silicon substrate was used instead of the X-cut lithium niobate substrate (electro-optical crystal substrate); and the hole diameter and period of the substrate were set to 204 nm and 300 nm, respectively. Each of the resultant optical scanning devices was subjected to the same evaluations as those of Comparative Example 1. As a result, the propagation loss of the optical waveguide of the device was 0.5 dB/cm. Further, laser light output from the optical waveguide was a so-called fan beam shape that was a line shape in plan view and was a fan shape when viewed from the optical waveguide direction, and the angle of the fan (the spread angle of the fan) was 30°. In addition, even when a voltage to be applied to the optical scanning device was changed, the emission angle of the laser light did not change.

The waveguide device according to the embodiment of the present invention may be used as an optical scanning device and an optical modulation device in a wide range. The optical scanning device is used as, for example, a laser radar, a laser scanner, or LIDAR, and may be applied to an obstacle-detecting system or a ranging system for the automatic operation control of an automobile or for the position control of a robot or a drone.

What is claimed is:

1. An optical scanning device, comprising:
    a photonic crystal layer having holes periodically formed in an electro-optical crystal substrate;
    a line-defect optical waveguide formed in the photonic crystal layer;
    a first electrode arranged above the electro-optical crystal substrate, the first electrode being transparent to light;
    a second electrode arranged below the electro-optical crystal substrate, and
    a diffraction grating arranged in at least one portion selected from an upper portion, a left side surface portion, and a right side surface portion of the optical waveguide,
    wherein each of the first electrode and the second electrode overlaps the optical waveguide in a thickness direction of the photonic crystal layer,
    wherein a refractive index of the first electrode is lower than a refractive index of the electro-optical crystal substrate,
    wherein a refractive index difference between the electro-optical crystal substrate and the first electrode is 0.2 or more and 1.2 or less,
    wherein the first electrode is configured to change an emission angle of light emitted from an upper surface of the optical waveguide and to transmit the emitted light.

2. The optical scanning device according to claim 1, wherein the second electrode is transparent to light, and is brought into contact with the electro-optical crystal substrate, and
    wherein the second electrode has a refractive index lower than the refractive index of the electro-optical crystal substrate.

3. The optical scanning device according to claim 2, further comprising:
    a substrate arranged below the second electrode; and
    a low-refractive index portion positioned between the second electrode and the substrate, the low-refractive index portion having a refractive index lower than the refractive index of the electro-optical crystal substrate,
    wherein at least part of the low-refractive index portion overlaps the optical waveguide in the thickness direction of the photonic crystal layer.

4. The optical scanning device according to claim 3, further comprising a joining portion arranged between the second electrode and the substrate to join the second electrode and the substrate to each other,
    wherein the joining portion has a cavity configured to function as the low-refractive index portion.

5. The optical scanning device according to claim 1, further comprising a low-refractive index portion positioned between the electro-optical crystal substrate and the second electrode, the low-refractive index portion having a refractive index lower than the refractive index of the electro-optical crystal substrate,
    wherein the low-refractive index portion overlaps the optical waveguide in the thickness direction of the photonic crystal layer.

6. The waveguide optical scanning device according to claim 5, further comprising a joining portion arranged between the electro-optical crystal substrate and the second electrode to join the electro-optical crystal substrate and the second electrode to each other,
    wherein a lower surface of the electro-optical crystal substrate, an upper surface of the second electrode, and the joining portion define a cavity configured to function as the low-refractive index portion.

7. The optical scanning device according to claim 1, wherein the electro-optical crystal substrate includes one selected from the group consisting of: lithium niobate; lithium tantalate; potassium titanate phosphate; potassium lithium niobate; potassium niobate; potassium tantalate niobate; and a solid solution of lithium niobate and lithium tantalate.

8. The optical scanning device according to claim 1, wherein the refractive index of the first electrode is 1.8 or less.

* * * * *